(12) United States Patent
Nishi

(10) Patent No.: US 6,717,897 B2
(45) Date of Patent: Apr. 6, 2004

(54) OPTICAL PICKUP APPARATUS, OPTICAL DISC APPARATUS, AND TRACK RECOGNITION SIGNAL DETECTION METHOD

(75) Inventor: Noriaki Nishi, Tokyo (JP)

(73) Assignee: Sony Corporation, Tokyo (JP)

( * ) Notice: Subject to any disclaimer, the term of this patent is extended or adjusted under 35 U.S.C. 154(b) by 356 days.

(21) Appl. No.: 09/903,176

(22) Filed: Jul. 11, 2001

(65) Prior Publication Data

US 2002/0018420 A1 Feb. 14, 2002

(30) Foreign Application Priority Data

Jul. 12, 2000 (JP) ......................... 2000-211878

(51) Int. Cl.$^7$ ................................. G11B 7/00
(52) U.S. Cl. .................. 369/53.29; 369/44.37
(58) Field of Search ............... 369/53.29, 53.25, 369/53.2, 53.39, 53.4, 44.26, 44.37, 44.27, 110.02, 121, 94, 44.23, 44.12

(56) References Cited

U.S. PATENT DOCUMENTS

| | | | | |
|---|---|---|---|---|
| 5,202,860 A | * | 4/1993 | Takahashi et al. | 369/110.02 |
| 5,208,801 A | * | 5/1993 | Finegan | 369/44.23 |
| 5,345,072 A | * | 9/1994 | Hayashi et al. | 369/44.37 |
| 5,696,749 A | * | 12/1997 | Brazas et al. | 369/112.09 |
| 5,703,856 A | * | 12/1997 | Hayashi et al. | 369/53.2 |
| 6,091,693 A | * | 7/2000 | Morimoto | 369/44.26 |
| 6,301,216 B1 | * | 10/2001 | Takahashi | 369/44.23 |
| 6,480,456 B1 | * | 11/2002 | Kawamura et al. | 369/121 |
| 6,512,608 B2 | * | 1/2003 | Ohyama | 369/44.37 |
| 6,552,990 B1 | * | 4/2003 | Kajiyama et al. | 369/44.37 |

* cited by examiner

Primary Examiner—Thang V. Tran
(74) Attorney, Agent, or Firm—Frommer Lawrence & Haug LLP

(57) ABSTRACT

A primary spot and a secondary spot are formed on an optical disc 101. The primary spot is used for recording and reproduction. The secondary spot is positioned apart from the primary spot. The secondary spot differs from the primary spot in a distance from an objective lens. This distance (defocus amount) Def satisfies a range: $0.4 \times \text{Def0} \leq \text{Def} \leq 1.7 \times \text{Def0}$. It is assumed that a light source wavelength is $\lambda$, a track pitch of the optical disc 101 is Tp, and a numerical aperture of the objective lens is NA and that $\text{Def0} = [0.178\lambda/\{1-\cos(\sin^{-1} \text{NA})\}] \cdot [\{1-(\lambda/(\text{Tp} \cdot \text{NA}))\} + 2.35]$.

43 Claims, 31 Drawing Sheets x   y   z

PHOTODETECTOR FACE

OPTICAL PICKUP APPARATUS, OPTICAL DISC APPARATUS, AND TRACK RECOGNITION SIGNAL DETECTION METHOD

BACKGROUND OF THE INVENTION

1. Field of the Invention

The present invention relates to an optical pickup apparatus for writing and reading an information signal onto an optical recording medium, an optical disc apparatus for recording and reproducing an information signal for an optical recording medium comprising such optical pickup apparatus, and a track recognition signal detection method for receiving a track recognition signal for receiving a recording track position on this optical disc apparatus. More specifically, the present invention concerns an optical disc apparatus for land-groove recording, and an optical disc apparatus and a track recognition signal detection method used for this optical disc apparatus.

2. Prior Art

Conventionally, an optical recording medium such as an optical disc is proposed. Further, an optical disc apparatus is proposed as an apparatus for recording and reproducing an information signal using such an optical recording medium. The optical disc apparatus uses optical discs based on various methods as optical recording media. This optical disc apparatus uses an optical pickup apparatus to write and read an information signal on the optical disc.

This optical pickup apparatus includes a light source such as a semiconductor laser. The apparatus is so configured that a light beam generated from this light source is condensed and irradiated to the signal recording surface of an optical disc via an objective lens. According to this configuration, the optical pickup apparatus writes an information signal on the signal recording surface by using the light beam irradiated onto the signal recording surface. Further, the apparatus reads the information signal recorded on the signal recording surface by detecting a reflected light beam on the signal recording surface where the light beam is irradiated.

The optical pickup apparatus writes and reads an information signal along lands or grooves which are formed spirally or cylindrically on the signal recording surface of the optical disc.

Presently, optical discs are increasing a recording density for information signals to be recorded. As a read-only ROM disc, for example, a DVR (trade name) is proposed. It uses an optical disc 120 mm in diameter like a compact disc (CD) (trade name) and provides a recording capacity of 4.7 GB which is approximately seven times as large as a 650 MB compact disc.

A recording density is also increasing for rewritable discs which can record and reproduce information signals. Such a rewritable disc is positioned as DVD. There is proposed an optical disc apparatus using a so-called DVD-RAM disc. In order to increase the recording density for information signals to be recorded, this DVD-RAM disc employs the land-groove recording system which records information signals on both a land and a groove, not just on either of them as is the case with a conventional system.

In recent years, the DVR format is developed as an optical disc format for further increasing the recording density. This format uses a shortwave light source with a light emission wavelength of approximately 405 nm and also uses a high NA (numerical aperture) objective lens of 0.85 NA. This format also uses the land-groove recording system.

As typified by the above-mentioned DVD-RAM, a high-density rewritable disc using the land-groove recording system causes the following problems because the land and the groove are set to almost the same width.

There may be the case where the land recording system is used for recording signals only on lands by using an optical disc on which a land is wider than a groove. In this case, as shown in FIG. 1, a phase shift occurs by a quarter cycle between a tracking error signal (TE) and a sum signal (SUM) for return beams (or primary spots when the 3-spot technique is used). Thereby, one cycle is assumed to range from a groove to the next groove.

For example, tracking control is performed so that a tracking error signal (TE) becomes 0. This signal becomes 0 in two cases, namely when a light beam is irradiated to a land or to a groove. A level of the sum signal (SUM) can be used for discriminating between these two cases.

A signal is used to discriminate between the case where the light beam is irradiated to the land and the case where the light beam is irradiated to the groove. This signal is called a track recognition signal or a cross-track signal (CTS). When the land recording system is used as mentioned above, sum signal (SUM) levels may greatly differ depending on whether the light beam is irradiated to the land or to the groove. In this case, as shown in FIG. 2, it is possible to use a sum signal's alternate current (AC) component (AC-SUM) as the track recognition signal. As shown in FIG. 2, the sum signal's AC component forms a track recognition signal with the phase of 90 degrees differing from the tracking error signal.

The land recording system uses two signals: the tracking error signal and the sum signal's AC component. Because of this, even during a fast seek operation, it is possible to accurately determine the direction and the number of tracks traveled by a spot with reference to the recording track. This allows to stably count the number of tracks traveled and perform a tracking servo pull-in operation.

When the land-groove recording system is used, however, the land and the groove are generally set to approximately the same width in order to optimize recording and reproduction characteristics. Consequently, as shown in FIG. 3, the sum signals in the above description are generated almost alike independent of whether a light beam is irradiated to the land or the groove. It is impossible to generate a track recognition signal from this sum signal.

When the system records signals only on the land or the groove, a width difference between the land and the groove tends to become narrower according as track pitches decrease along with a demand for a higher recording density. Examples include DVD+RW and DVD-RW. Consequently, it is difficult to generate a track recognition signal from this sum signal.

As a result, it is difficult to access a specified recording track with a single operation during a fast seek operation frequently used for external storage devices, or business-use picture recording and editing apparatuses. There arises the problem of increasing an access time.

In order to solve these problems, Japanese Patent Laid-Open Publication No. 11-45451 discloses a method of receiving a track recognition signal or a cross-track signal (CTS). This method forms two side spots on an optical disc by shifting a quarter track each with reference to a primary spot. A difference between the corresponding push-pull signals is found to generate a signal with a 90-degree phase shifted from a push-pull signal for the primary spot.

In this case, a side spot position causing the maximum tracking error signal is shifted for a half track relative to the primary spot. On the other hand, a side spot position causing the maximum track recognition signal is shifted for a quarter track relative to the primary spot. The tracking error signal and the track recognition signal use different optimum side spot positions. There is the problem that the tracking error signal and the track recognition signal cause a large amplitude variation when an optical disc is remarkably eccentric or when a movement direction of the optical pickup apparatus deviates from the optical disc's radial direction.

BRIEF SUMMARY OF THE INVENTION

It is an object of the present invention to provide an optical pickup apparatus, a track recognition signal detection method, and an optical disc apparatus using the optical pickup apparatus and the track recognition signal detection method, wherein it is possible to generate a track recognition signal and allow a high-speed access without increasing the number of parts or complicating a configuration of parts even if it is necessary to use an optical recording medium such as DVD-RAM and DVR employing the land-groove recording system.

To solve the above-mentioned problems, an optical pickup apparatus according to the present invention comprises a light source having at least one light generation point for irradiating a light beam, an objective lens for converging and irradiating the light beam onto a signal recording surface of an optical recording medium, and optical detection means for receiving a reflected light beam from a signal recording surface of the optical recording medium.

In this optical pickup apparatus, a light beam irradiated from the light source comprises a primary light beam which forms a primary spot for recording and/or reproducing an information signal on the signal recording surface of the optical recording medium and a secondary light beam which forms a secondary spot at a position apart from the primary spot on the signal recording surface of the optical recording medium.

In the optical pickup apparatus, the secondary light beam differs from the primary light beam in a distance from an objective lens to a beam-condensing point and this distance difference Def satisfies a range: $0.4 \times \text{Def0} \leq \text{Def} \leq 1.7 \times \text{Def0}$. Here, it is assumed that a light emission wavelength for the light source is $\lambda$, a track pitch of the optical recording medium is Tp, and a numerical aperture of the objective lens is NA and that $\text{Def0} = [0.178\lambda/\{1-\cos(\sin^{-1} \text{NA})\}] \cdot [\{1-(\lambda/(\text{Tp} \cdot \text{NA}))\}+2.35]$.

An optical disc apparatus according to the present invention comprises an optical pickup apparatus for writing and/or reading an information signal on an optical recording medium having a land and groove and capable of recording an information signal on either or both of the land and the groove; and a servo circuit for controlling a position to write and/or read the information signal based on an output signal from the optical pickup apparatus.

In this optical disc apparatus, an optical pickup apparatus comprises a light source having at least one light generation point for irradiating a light beam, an objective lens for converging and irradiating the light beam onto a signal recording surface of an optical recording medium, and optical detection means for receiving a reflected light beam from a signal recording surface of the optical recording medium. In this optical pickup apparatus, a light beam irradiated from the light source comprises a primary light beam which forms a primary spot for recording and/or reproducing an information signal on the signal recording surface of the optical recording medium and a secondary light beam which forms a secondary spot at a position apart from the primary spot on the signal recording surface of the optical recording medium. The secondary light beam differs from the primary light beam in a distance from an objective lens to a beam-condensing point and this distance difference Def satisfies a range: $0.4 \times \text{Def0} \leq \text{Def} \leq 1.7 \times \text{Def0}$. Here, it is assumed that a light emission wavelength for the light source is $\lambda$, a track pitch of the optical recording medium is Tp, and a numerical aperture of the objective lens is NA and that $\text{Def0} = [0.1782\lambda/\{1-\cos(\sin^{-1} \text{NA})\}] \cdot [\{1-(\lambda/(\text{Tp} \cdot \text{NA}))\}+2.35]$.

An optical disc apparatus according to the present invention comprises an optical pickup apparatus for writing and/or reading an information signal on an optical recording medium having a land and groove and capable of recording an information signal on either or both of the land and the groove; and a servo circuit for controlling a position to write and/or read the information signal based on an output signal from the optical pickup apparatus. In this optical disc apparatus, the optical pickup apparatus comprises a light source having at least one light generation point for irradiating a light beam, an objective lens for converging and irradiating the light beam onto a signal recording surface of an optical recording medium, and optical detection means for receiving a reflected light beam from a signal recording surface of the optical recording medium. In the optical pickup apparatus, a light beam irradiated from the light source comprises a primary light beam which forms a primary spot for recording and/or reproducing an information signal on the signal recording surface of the optical recording medium and a secondary light beam which forms a secondary spot at a position apart from the primary spot on the signal recording surface of the optical recording medium. The secondary light beam differs from the primary light beam in a distance from an objective lens to a beam-condensing point and this distance difference is based on a light emission wavelength of the light source, a track pitch of the optical recording medium, and a numerical aperture of the objective lens, is output as an output signal from the optical detection means, and is set so as to maximize an amplitude of a track recognition signal for determining whether the primary light beam irradiates a land or a groove on the optical recording medium.

A track recognition signal detection method according to the present invention by using an optical pickup apparatus comprising a light source having at least one light generation point for irradiating a light beam, an objective lens for converging and irradiating the light beam onto a signal recording surface of an optical recording medium having a land and groove and capable of recording an information signal on either or both of the land and the groove, and optical detection means for receiving a reflected light beam from a signal recording surface of the optical recording medium.

In the optical pickup apparatus, a light beam irradiated from said light source comprises a primary light beam which forms a primary spot for recording and/or reproducing an information signal on the signal recording surface of said optical recording medium and a secondary light beam which forms a secondary spot at a position apart from said primary spot on the signal recording surface of said optical recording medium. Here, the secondary light beam is assumed to differ from said primary light beam in a distance from an objective lens to a beam-condensing point. This distance difference Def satisfies a range: $0.4 \times \text{Def0} \leq \text{Def} \leq 1.7 \times \text{Def0}$. It is assumed that a light emission wavelength for said light source is $\lambda$, a track pitch of said optical recording medium is Tp, and a numerical aperture of said objective lens is NA and that Def0=$[0.178\lambda/\{1-\cos(\sin^{-1} NA)\}]\cdot[\{1-(\lambda/(Tp\cdot NA))\}+2.35]$. The optical pickup apparatus generates a track recognition signal based on an output signal from the optical detection means.

As mentioned above, the optical pickup apparatus, the track recognition signal detection method, and the optical disc apparatus according to the present invention can provide an excellent track recognition signal based on a simple configuration even when a land-groove recording medium is used for land-groove recording.

The present invention allows land-groove recording to use conventional control methods such as a tracking servo pull-in operation, counting the number of track traverses and directions during a seek, and the like.

Accordingly, the present invention can provide an optical pickup apparatus and an optical disc apparatus performing land-groove recording by using, say, DVD-RAM and DVR capable of decreasing the number of parts, simplifying a configuration of parts, saving costs, and providing a high-speed access.

Further, the present invention is generally applicable to optical discs according to other standards using the land-groove recording as well as DVD-RAM and DVR and can provide an optical pickup apparatus and an optical disc apparatus comprising a small number of parts and a simple configuration of parts.

Namely, the present invention can provide an optical pickup apparatus, a track recognition signal detection method, and an optical disc apparatus using the optical pickup apparatus and the track recognition signal detection method, wherein it is possible to generate a track recognition signal and allow a high-speed access without increasing the number of parts or complicating a configuration of parts even if it is necessary to use an optical recording medium such as DVD-RAM and DVR employing the land-groove recording system.

DETAILED DESCRIPTION OF THE INVENTION

Embodiments of the present invention will be described with reference to the accompanying drawings.

The optical disc apparatus according to the present invention comprising the optical pickup apparatus according to the present invention can select an optical disc as a optical recording medium out of a plurality of types of optical discs and record and reproduce information signals on these optical discs. The optical disc apparatus can perform land-groove recording by using an optical disc capable of land-groove recording such as a so-called DVD-RAM disc, for example.

Figure 5:
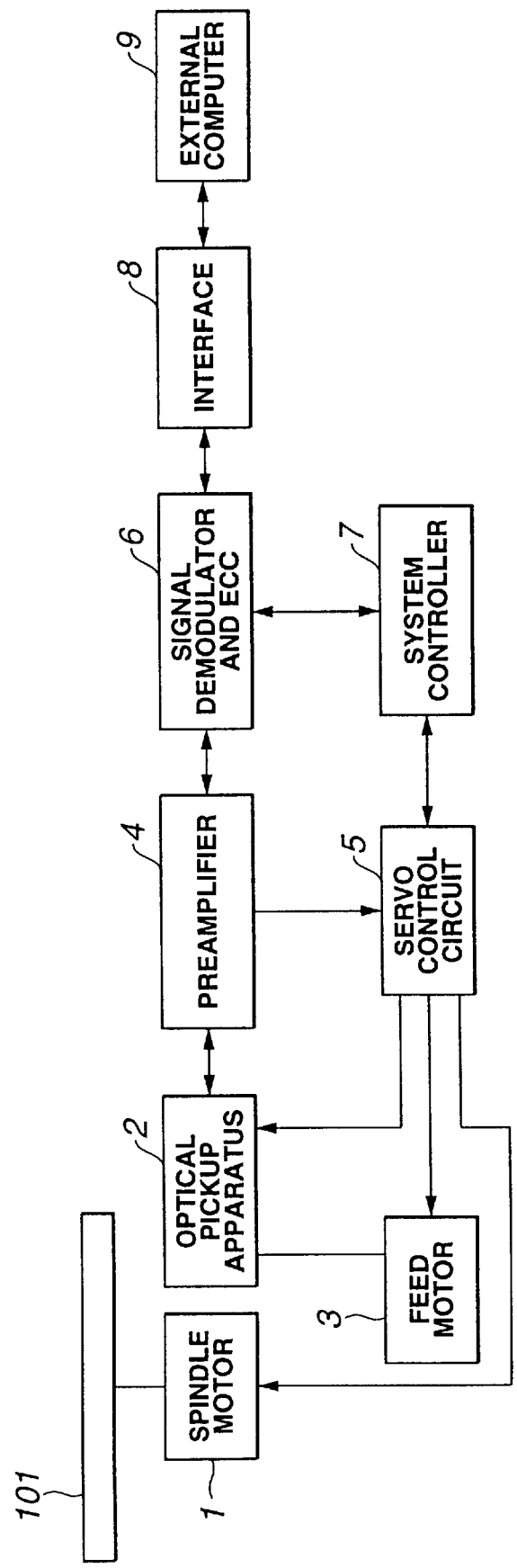
FIG. 5 is a block diagram showing a configuration of an optical disc apparatus according to the present invention.

As shown in FIG. 5, this optical disc apparatus includes a spindle motor 1 as means for rotatively driving an optical disc as an optical recording medium. The spindle motor 1 has a drive shaft provided with a disc table (not shown). An optical disc 101 is mounted on this disc table and is rotated with the disc table. The spindle motor 1 is controlled by a servo control circuit 5 and a system controller 7 and drives at a specified revolution speed.

An optical pickup apparatus 2 writes and reads an information signal from the optical disc 101 rotated by the spindle motor 1. The optical pickup apparatus 1 is moved by a feed motor 3 in a radial direction of the optical disc 101 mounted on the disc table. The optical pickup apparatus 1 and the feed motor 3 are also driven under control of the servo control circuit 5.

The optical pickup apparatus 2 irradiates a light beam onto a signal recording surface of the optical disc 101 and reads an information signal from the recording surface by detecting a reflected light beam for this light beam. The signal read by the optical pickup apparatus 2 from the optical disc 101 is amplified by a preamplifier 4 and is sent to a signal modulation/demodulation and ECC block 6 and the servo control circuit 5. According to the type of an optical recording medium to be reproduced, the signal modulation/demodulation and ECC block 6 modulates and demodulates signals and supplies an ECC (error correction code). Based on the transferred signal, the signal modulation/demodulation and ECC block 6 generates a focus error signal, a tracking error signal, a track recognition signal, an RF signal, and the like. The servo control circuit 5 controls the optical pickup apparatus 2 based on the focus error signal, the tracking error signal, and the track recognition signal generated from the signal modulation/demodulation and ECC block 6.

When the signal demodulated in the signal modulation/demodulation and ECC block 6 is data for a computer's data storage, this signal is sent to an external computer 9 and the like via an interface 8. In this case, the external computer 9 and the like can receive a signal recorded on the optical disc 101 as a reproduction signal.

Based on a signal sent from the signal modulation/demodulation and ECC block 6, the optical pickup apparatus 2 irradiates a light beam to the signal recording surface of the rotatively operated optical disc 101. Irradiating light beams allows an information signal to be written on the signal recording surface of the optical disc.

Figure 6:
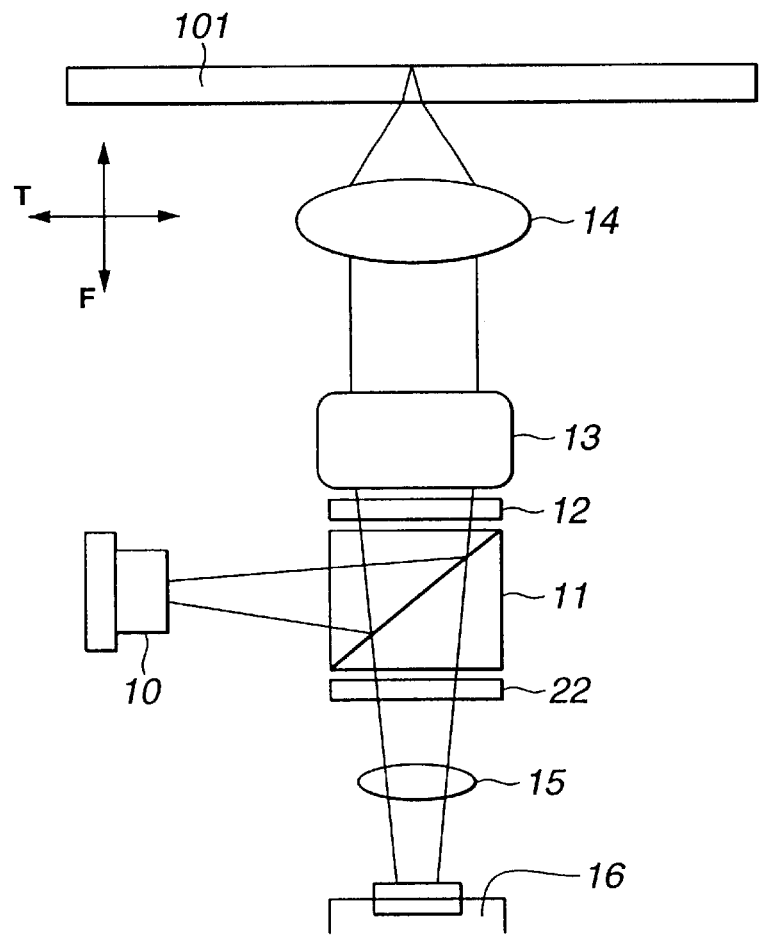
FIG. 6 is a side view showing a configuration of the optical pickup apparatus according to the present invention.
Figure 7:
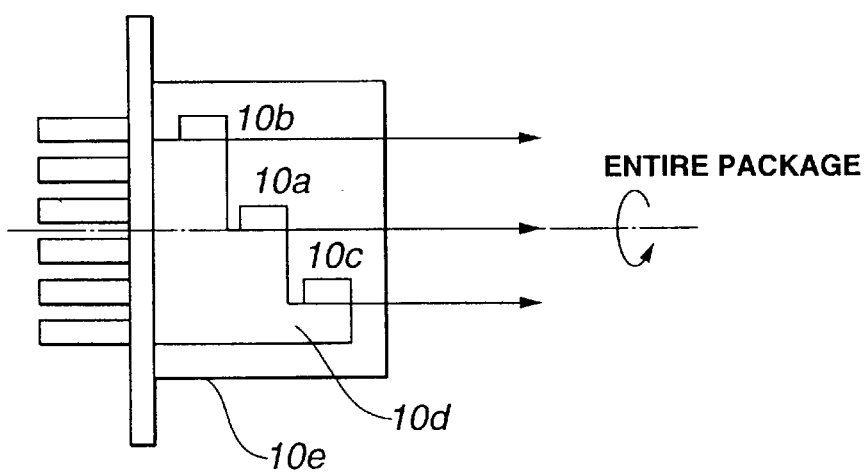
FIG. 7 is a side view showing a configuration of a light source for the above-mentioned optical pickup apparatus.

As shown in FIG. 6, the optical pickup apparatus 2 includes a light source 10 arranged rotatively around an optical axis. The light source 10 has at least one light generation point for irradiating a light beam. According to this embodiment as shown in FIG. 7, the light source includes three light generation points 10a, 10b, and 10c.

There may be a case where the optical pickup apparatus 2 is used to read an information signal from the optical recording medium subject to land-groove recording through the use of this optical pickup apparatus 2. In such a case, light beams radiated from light generation points 10a, 10b, and 10c of this light source 10 are supplied to a polarizing beam splitter prism 11. These light beams cause an S-polarization state with respect to a dielectric multilayer film of this polarizing beam splitter prism 11. Accordingly, the dielectric multilayer film reflects the almost entire light volume to let the light beams enter a quarter-wavelength plate 12. The light beam supplied to the quarter-wavelength plate 12 passes this quarter-wavelength plate 12 to become a circular polarization state, passes a collimator lens 13 to become a parallel light beam, and then enters an objective lens 14.

The polarizing beam splitter prism 11 generally comprises a pair of triangular prisms and a dielectric multilayer film. The pair of triangular prisms is glued to each other to form a cube. The dielectric multilayer film is formed between these triangular prisms by means of vaporization or sputtering. Regarding an incident light beam to this polarizing beam splitter prism 11, a P polarization component applied to the dielectric multilayer film passes this film. An S polarization component applied to the dielectric multilayer film is reflected on this film.

The objective lens 14 is movably supported by a biaxial actuator (not shown) in a focus direction indicated by arrow F and in a tracking direction indicated by arrow T, each shown in FIG. 6. The objective lens converges each of incident light beams on the signal recording surface of the optical disc 101.

At this time, one of light beams irradiated from three light generation points 10a, 10b, and 10c is converged on the signal recording surface. The other two light beams are defocused on the signal recording surface. Namely, the primary and secondary light beams cause different distances from the objective lens 14 to a beam-condensing point.

The tree light beams are irradiated onto the signal recording surface of the optical disc 101 and are reflected on this surface. These reflected light beams pass the objective lens 14, the collimator lens 13, and the quarter-wavelength plate 12 to become a linear polarization state, and reach the polarizing beam splitter prism 11. In this prism, the beams become a P-polarization state with respect to a dielectric multilayer film. Accordingly, the almost entire light volume passes the dielectric multilayer film. Separated from an optical path returning to the light source 10, the light beams travel an optical path passing an optical branch element 22 and a multiple-lens 15 to enter an optical detection element 16. The multiple-lens 15 is a combination of a concave lens and a cylindrical lens. The multiple-lens extends the distance between a reflected light beam and a beam-condensing point and causes astigmatism to the reflected light beam.

Optical parts constituting the optical pickup apparatus 2 are individually mounted and supported in an optical block (not shown).

As shown in FIG. 7, the light source 10 comprises a primary light generation point 10a, a first secondary light generation point 10b, and a second secondary light generation point 10c. The primary light generation point 10a generates a primary light beam formed on the signal recording surface of the optical disc 101. When the primary spot is focused on the signal recording surface of the optical disc 101, the first secondary light generation point 10b is focused before passing the signal recording surface to generate a first secondary light beam for forming a first secondary spot. When the primary spot is focused on the signal recording surface of the optical disc 101, the second secondary light generation point 10c is focused after passing the signal recording surface to generate a second secondary light beam for forming a second secondary spot. With reference to the primary light beam, the primary and secondary light beams cause different distances from the objective lens to the beam-condensing points. The primary spot is formed away from each secondary spot on the signal recording surface of the optical disc 101. The primary light generation point 10a, the secondary light generation points 10b and 10c are supported by a holder section 10d and are contained in a package 10e.

There is provided an adjustment mechanism for rotatively operating the whole of the package 10e around the optical axis. Without changing a focusing position of the primary spot, this adjustment mechanism enables the light source 10 to vary a positional relation between each secondary spot and a recording track on the signal recording surface of the optical disc and to adjust and maintain an optimum positional relation. Each secondary spot is formed at a position satisfying an equation S Tp·n/2, where S is an absolute value for a distance up to the primary spot in the normal line direction of recording tracks formed on the signal recording surface of the optical disc, Tp is a track pitch, and n is an integer.

In this the present invention, the track pitch (Tp) refers to a distance from a land to the next land or a distance from a groove to the next groove. This meaning is also applicable even when the land-groove system is used for recording information signals corresponding to both the land and the groove on the optical disc.

As mentioned above, the primary and secondary light beams cause different distances from the objective lens 14 to the beam-condensing points. It is assumed that Def signifies a difference between distances from the objective lens 14 to the beam-condensing points for the primary and secondary light beams. Assuming that is a light emission wavelength A of the light source 10; Tp is a track pitch on the optical disc 101; and NA is a numerical aperture of the objective lens 14, and that Def0=[0.178λ/{1−cos(sin$^{-1}$ NA)}]·[{1−(λ/(Tp·NA))}+2.35], the distance Def should satisfy 0.4×Def0≦Def≦1.7×Def0.

Figure 8:
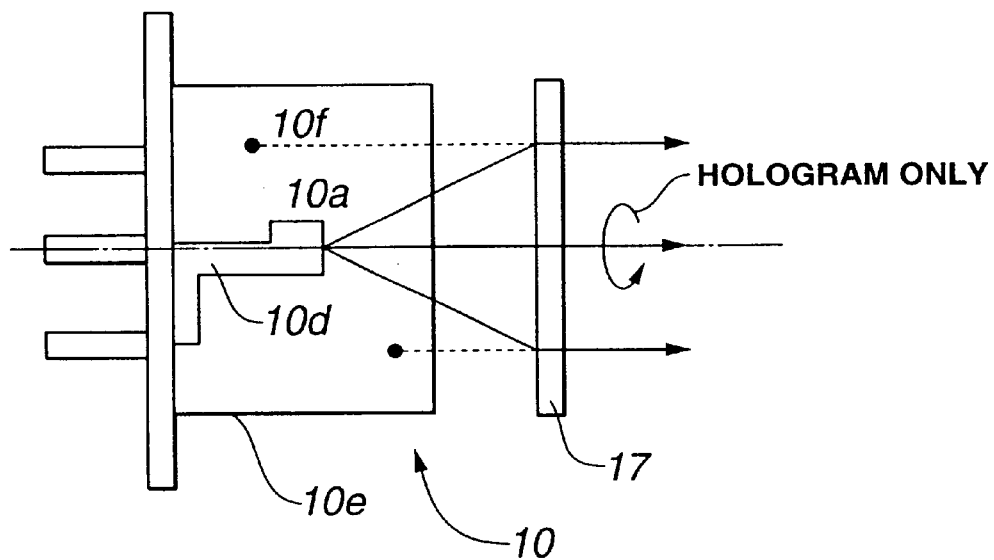
FIG. 8 is a side view showing another configuration of the light source for the above-mentioned optical pickup apparatus.
Figure 9:
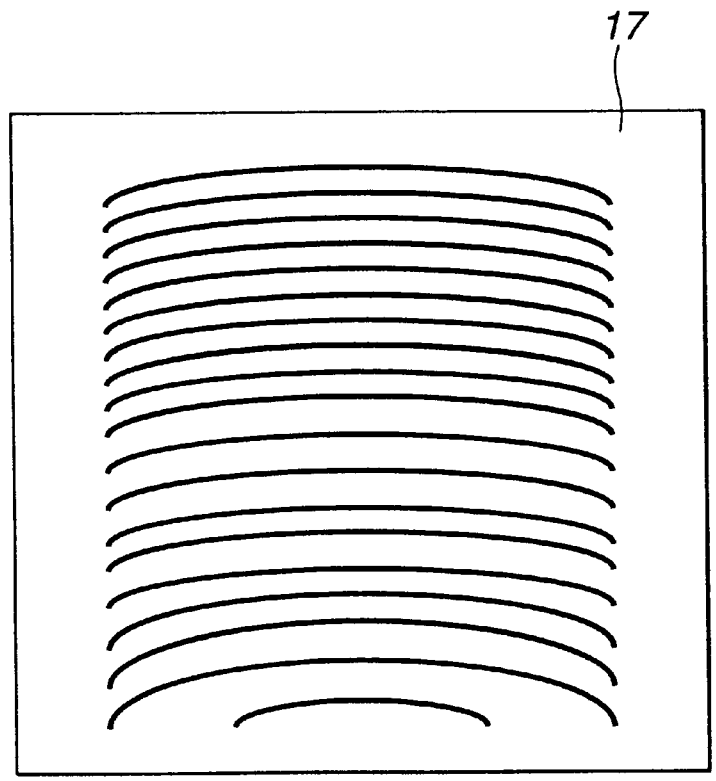
FIG. 9 is a front view showing a light diffraction element constituting the above-mentioned light source.

As shown in FIG. 8, the light source 10 may be configured by having one light generation point 10a and a light diffraction element 17. As shown in FIG. 9, the light diffraction element 17 is configured as a hologram pattern with power (hologram element). When a light beam is issued from the light generation point 10a, the light beam is diffracted by the light diffraction element 17 and is separated into a zero order beam and positive and negative first order beams. The zero order beam is same as the primary light beam which is issued from the light generation point 10a and progresses straight. The positive first order beam is same as the first secondary light beam which is issued not from the light generation point 10a, but from a first virtual light generation point 1 Of deviating from the light generation point 10a. The negative first order beam is same as the second secondary light beam which is issued not from the light generation point 10a, but from a second virtual light generation point 10g deviating from the light generation point 10a. The secondary light beams cause different distances from the objective lens to the beam-condensing points with reference to the primary light beam. The primary light beam forms a primary spot. The secondary light beam forms a secondary spot. The primary spot and the secondary spots are formed away from each other on the signal recording surface of the optical disc 101.

The light source 10 is provided with an adjustment mechanism for rotatively operating the light diffraction element 17 around the optical axis. Without changing a focusing position of the primary spot, this adjustment mechanism enables the light source 10 to vary a positional relation between each secondary spot and a recording track on the signal recording surface of the optical disc and to adjust and maintain an optimum positional relation. Each secondary spot is formed at a position satisfying an equation S≈Tp·n/2, where S is an absolute value for a distance up to the primary spot in the normal line direction of recording tracks formed on the signal recording surface of the optical disc, Tp is a track pitch, and n is an integer.

Figure 10:
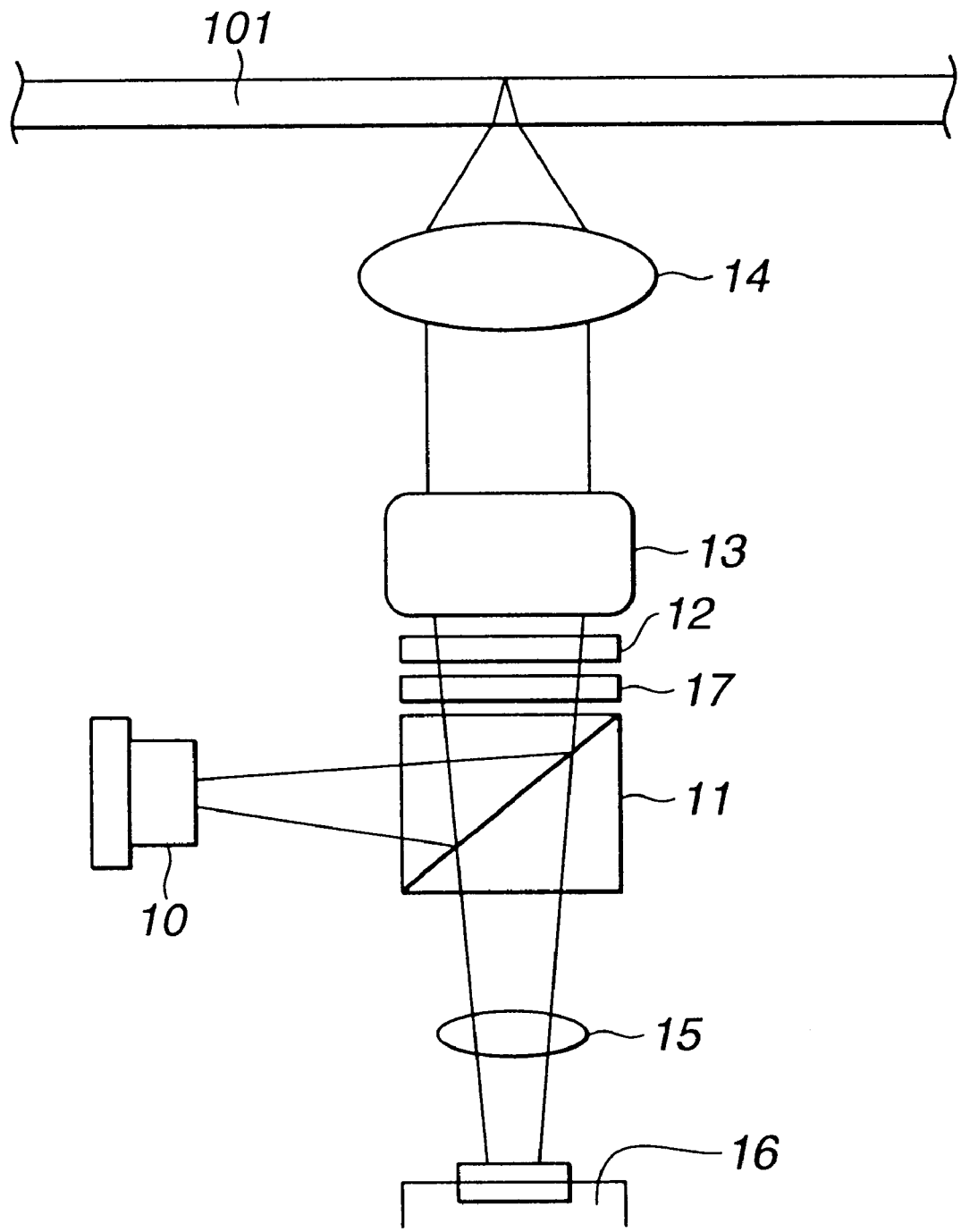
FIG. 10 is a side view showing another configuration of the optical pickup apparatus according to the present invention.

The light diffraction element 17 can be configured with a polarization hologram element. In this case, as shown in FIG. 10, the light diffraction element 17 may be placed between the polarizing beam splitter prism 11 and the quarter-wavelength plate 12, not between the light source 10 and the polarizing beam splitter prism 11 as mentioned above. The polarization hologram element works as a hologram for a light beam directed to the optical disc. The polarization hologram element can be formed so that no optical effect is given to a light beam returning from the optical disc.

Figure 11:
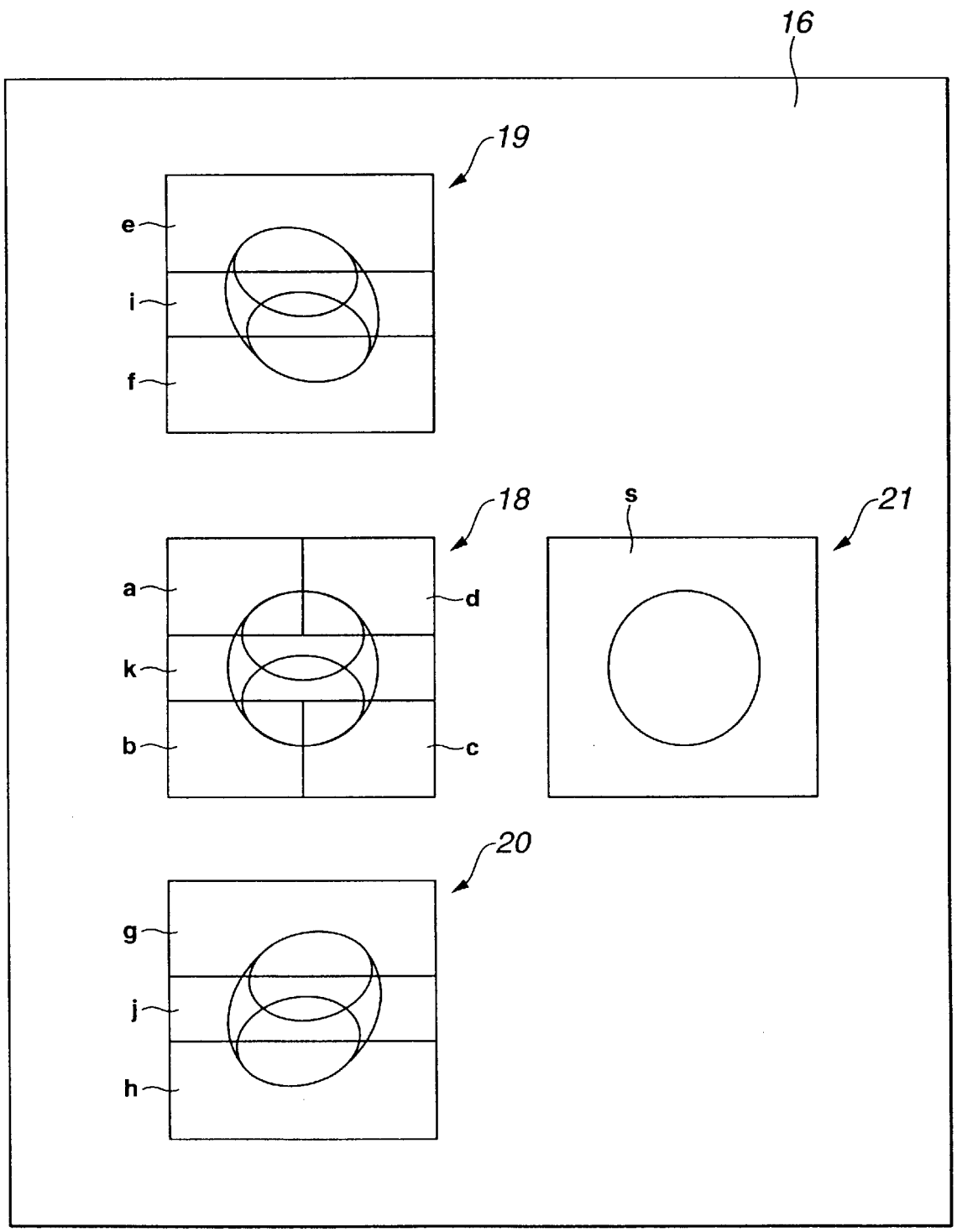
FIG. 11 is a front view showing a configuration of a light-receiving section on an optical detection element of the optical pickup apparatus according to the present invention and states of beam spots on the optical detection element.

As shown in FIG. 11, the optical detection element 16 comprises a first primary light-receiving section 18, a first secondary light-receiving section 19, a second secondary light-receiving section 20, and a second primary light-receiving section 21. The first primary light-receiving section 18 receives a primary reflected light beam from the primary spot. The first secondary light-receiving section 19 receives a primary secondary reflected light beam from the fist secondary spot. The second secondary light-receiving section 20 receives a second secondary reflected light beam from the second secondary spot. The second primary light-receiving section 21 independently receives a light beam branching from the primary reflected light beam from the primary spot. FIG. 6 shows how the primary reflected light beam branches to the second primary light-receiving section 21. For this purpose, the optical branch element 22 such as, say, a Wollaston prism is installed between the polarizing beam splitter prism 11 and the multiple-lens 15.

The first primary light-receiving section 18 comprises a light-receiving element k, and four light-receiving elements a, b, c, and d. The light-receiving element k receives only the center portion of a reflected light beam from the primary spot. The light-receiving elements a, b, c, and d are radially arranged from the center of the first primary light-receiving section for detecting a focus error signal based on a principle similar to the astigmatic method. The light-receiving elements a, c and the light-receiving elements b, d are diagonally arranged through the intermediation of the light-receiving element k at the center of the first primary light-receiving section 18. These five light-receiving elements k, a, b, c, and d output independent optical detection signals k, a, b, c, and d, respectively. The first primary light-receiving section 18 is characterized by having the light-receiving element k which receives only the center portion of the reflected light beam from the primary spot. Even when positive and negative first order beams overlap to increase an optical intensity and move the spot, it is possible to prevent a variation of the focus error signal due to this spot movement.

The second primary light-receiving section 21 comprises one light-receiving element s which receives a light beam reflected from the primary spot branched by the optical branch element. The light-receiving element s outputs an optical detection signal s. This optical detection signal s becomes a so-called RF signal read from the optical disc 101.

The secondary light-receiving section 19 comprises three parallel arranged light-receiving elements e, i, and f The secondary light-receiving section 20 comprises three parallel arranged light-receiving elements h, j, and g. In the secondary light-receiving section 19, the light-receiving element i is sandwiched between the light-receiving elements e and f. Likewise, in the secondary light-receiving section 20, the light-receiving element j is sandwiched between the light-receiving elements h and g. These six light-receiving elements e, i, f, h, j, and g output independent optical detection signals e, i, f, h, j, and g.

An optical detection signal output from this optical detection element 16 is converted from a current to a voltage by an amplifier (not shown) formed on a semiconductor substrate of the optical detection element 16. Then, the converted signal is sent to an internal arithmetic circuit or an external arithmetic circuit (outside the optical detection element) connected to the light-receiving section 18, 19, 20, or 21. The arithmetic circuit processes a focus error signal FE, a tracking error signal TE, a track recognition signal CTS, and an RF signal as follows.

Namely, the track recognition signal CTS is generated according to the following operation.

$CTS\{(e+f)-i\}-\{(g+h)-j\}$

The focus error signal FE, the tracking error signal TE, and the RF signal are generated according to the following operations. The focus error signal FE is generated based on a principle similar to the astigmatic method. The tracking error signal TE is generated based on the so-called differential push-pull method.

$FE=(a+c)-(b+d)$ $TE=\{(a+d)-(b+c)\}-K\cdot\{(e-f)+(g-h)\}$ (where, $K$ is a coefficient)

$RF=s$

The following describes the signal detection principle in the track recognition signal detection method according to the present invention.

The present invention forms secondary spots with different focuses based on the primary spot. When the primary spot is focused to enable recording and reproduction of information signals, the secondary spots are designed to be unfocused.

With this state, the primary spot is focused when beam spots cross recording tracks on the optical disc. The land and the groove provide an equal intensity distribution of reflected light beams. By contrast, the secondary spot is defocused. A change in the interference state on the wave surface causes a large difference in the intensity distribution of the reflected light beams at the land and the groove. It is possible to recognize tracks by using intensity distribution changes in reflected light beams from the secondary spots.

FIGS. 12 to 17 show results of computing intensity distributions and phase distributions of diffracted beams from the optical disc on an objective lens pupil in the optical pickup apparatus using a DVR disc (trade name) as an optical disc.

The computation results are based on the following conditions. A light beam irradiated from the optical pickup apparatus has a wavelength of 405 nm. The objective lens has a numerical aperture (NA) of 0.85. The optical disc has a recording track cycle of 0.60 μm. The groove has a reciprocating phase depth of λ/6. The land and the groove are rectangle with an equal width (0.30 μm).

Figure 12:
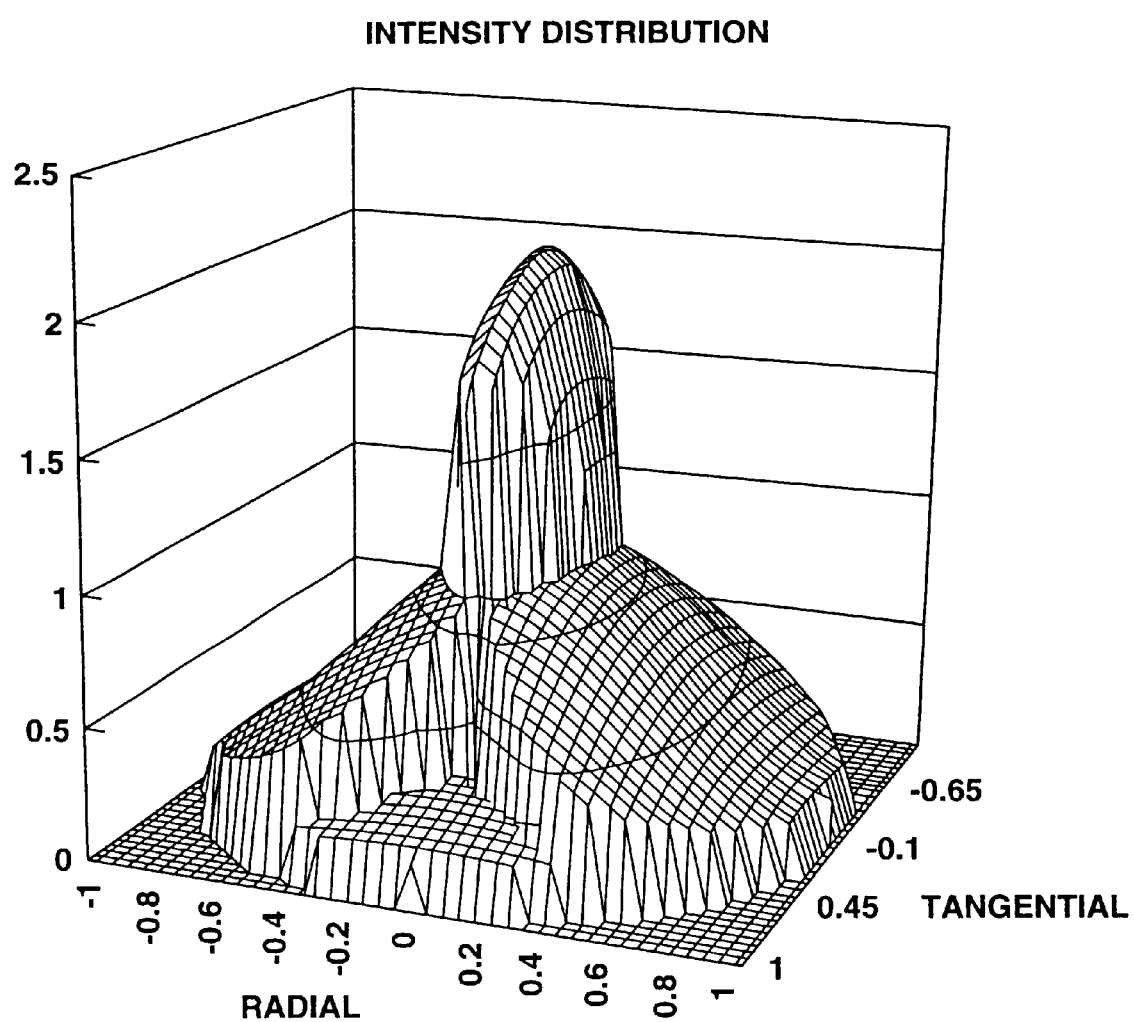
FIG. 12 is a graph showing a result of computing an intensity distribution of diffracted beams from the optical disc onto an objective lens pupil when the optical pickup apparatus uses a DVR optical disc for reproduction, a beam spot is placed on the groove, and there is a −0.35 m defocus on the optical disc.
Figure 13:
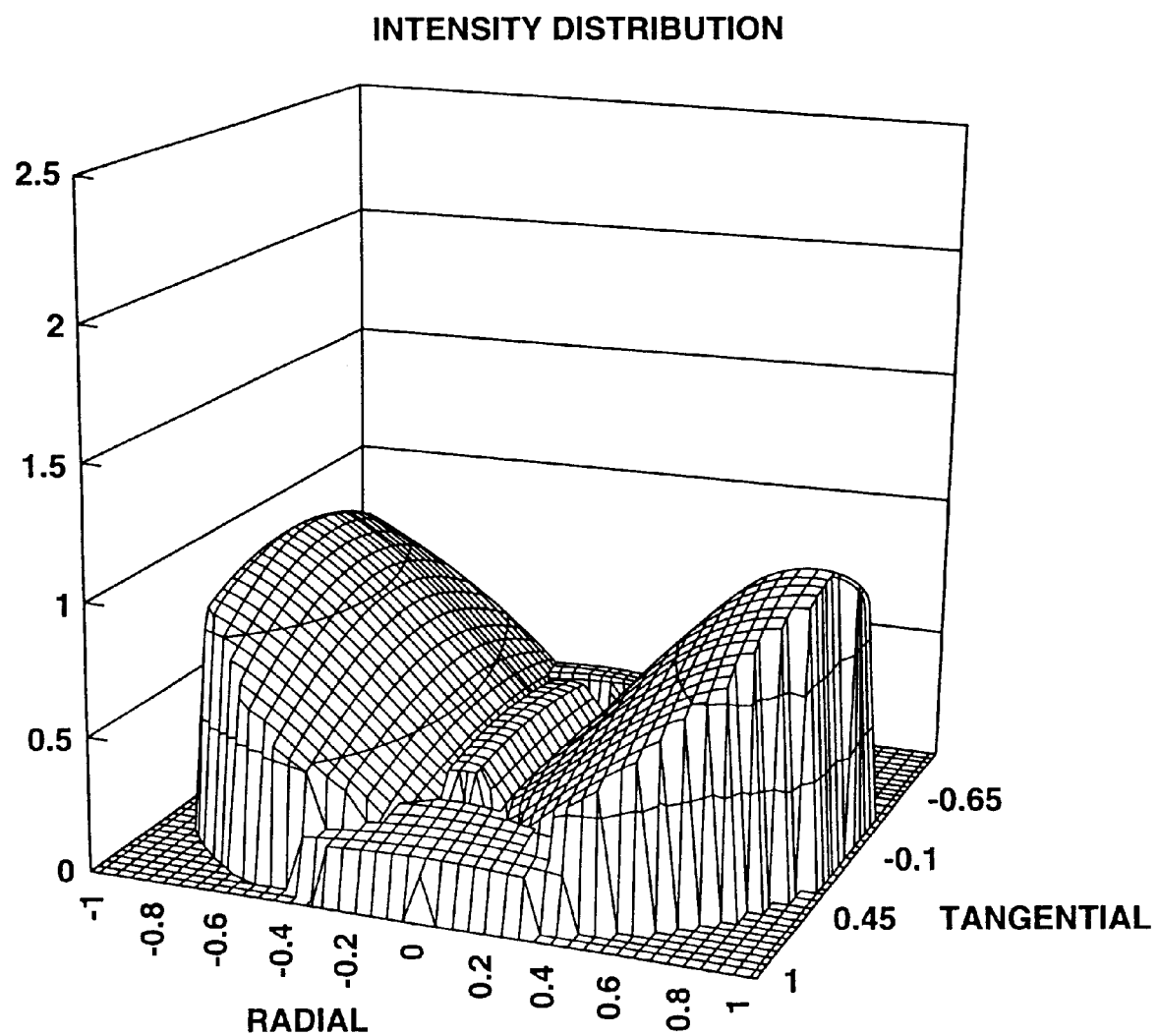
FIG. 13 is a graph showing a result of computing an intensity distribution of diffracted beams from the optical disc onto an objective lens pupil when the optical pickup apparatus uses a DVR optical disc for reproduction, a beam spot is placed on the land, and there is a −0.35 μm defocus on the optical disc.
Figure 14:
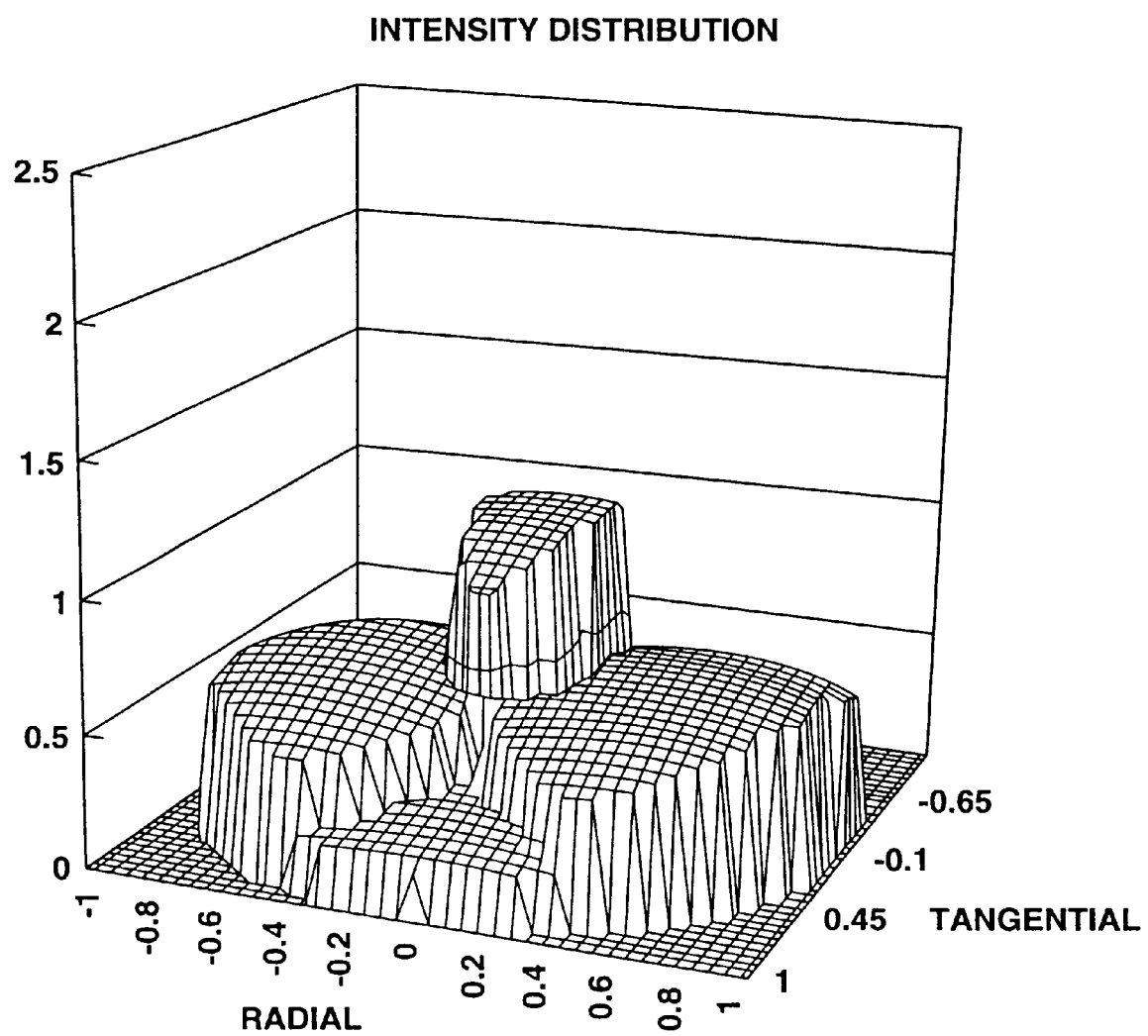
FIG. 14 is a graph showing a result of computing an intensity distribution of diffracted beams from the optical disc onto an objective lens pupil when the optical pickup apparatus uses a DVR optical disc for reproduction, a beam spot is placed on the groove, and there is no defocus on the optical disc.
Figure 15:
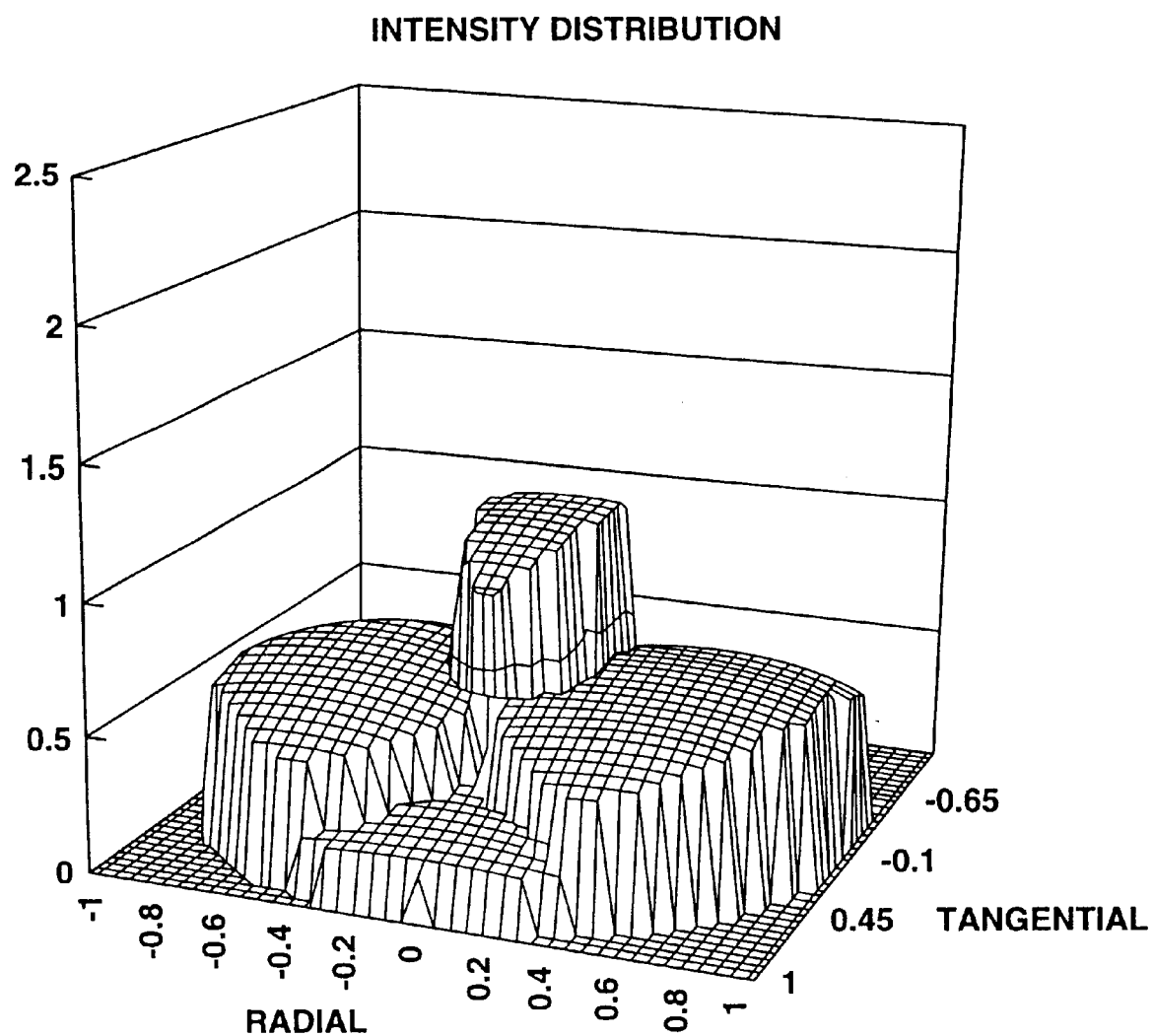
FIG. 15 is a graph showing a result of computing an intensity distribution of diffracted beams from the optical disc onto an objective lens pupil when the optical pickup apparatus uses a DVR optical disc for reproduction, a beam spot is placed on the land, and there is no defocus on the optical disc.
Figure 16:
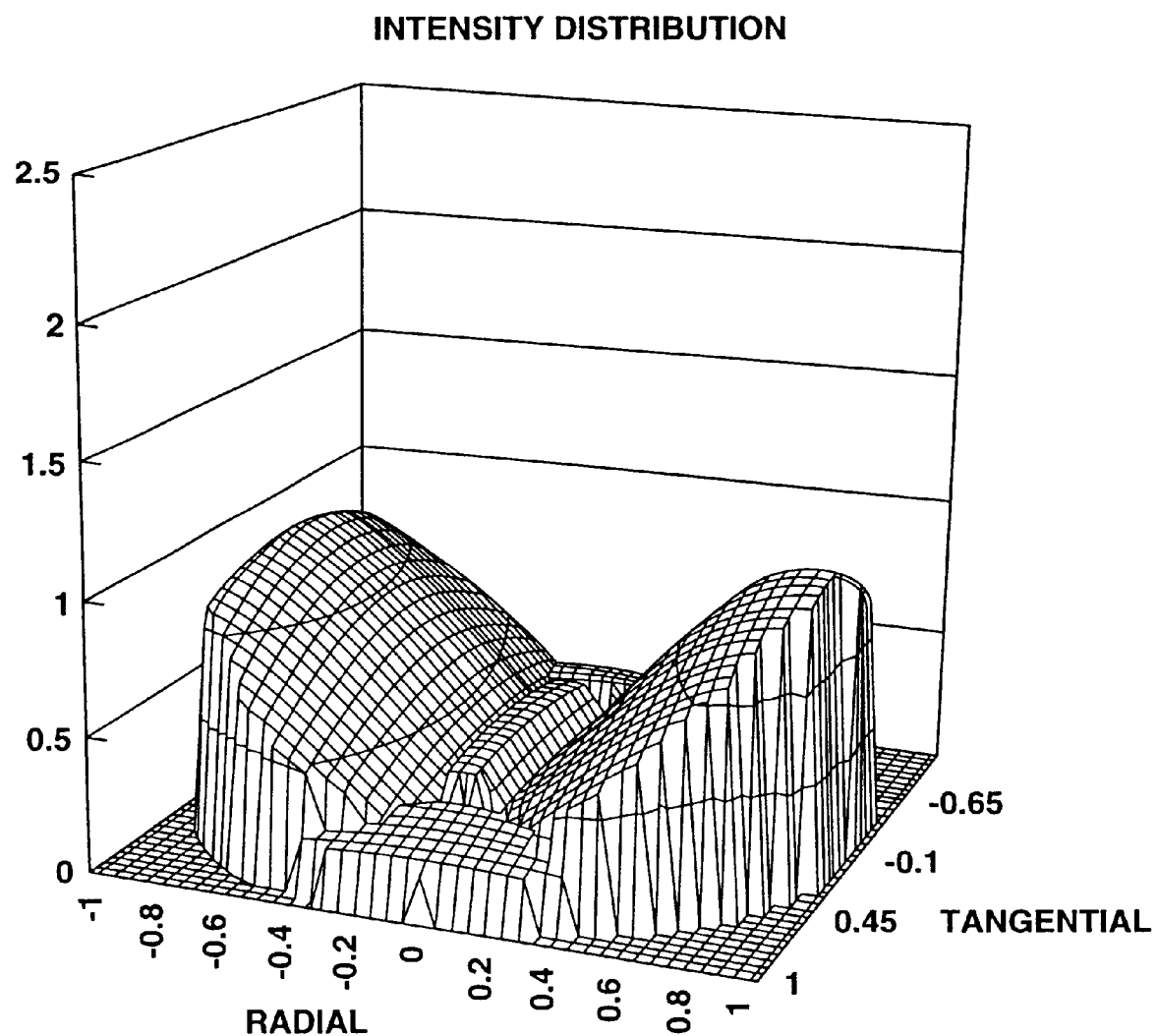
FIG. 16 is a graph showing a result of computing an intensity distribution of diffracted beams from the optical disc onto an objective lens pupil when the optical pickup apparatus uses a DVR optical disc for reproduction, a beam spot is placed on the groove, and there is a +0.35 μm defocus on the optical disc.
Figure 17:
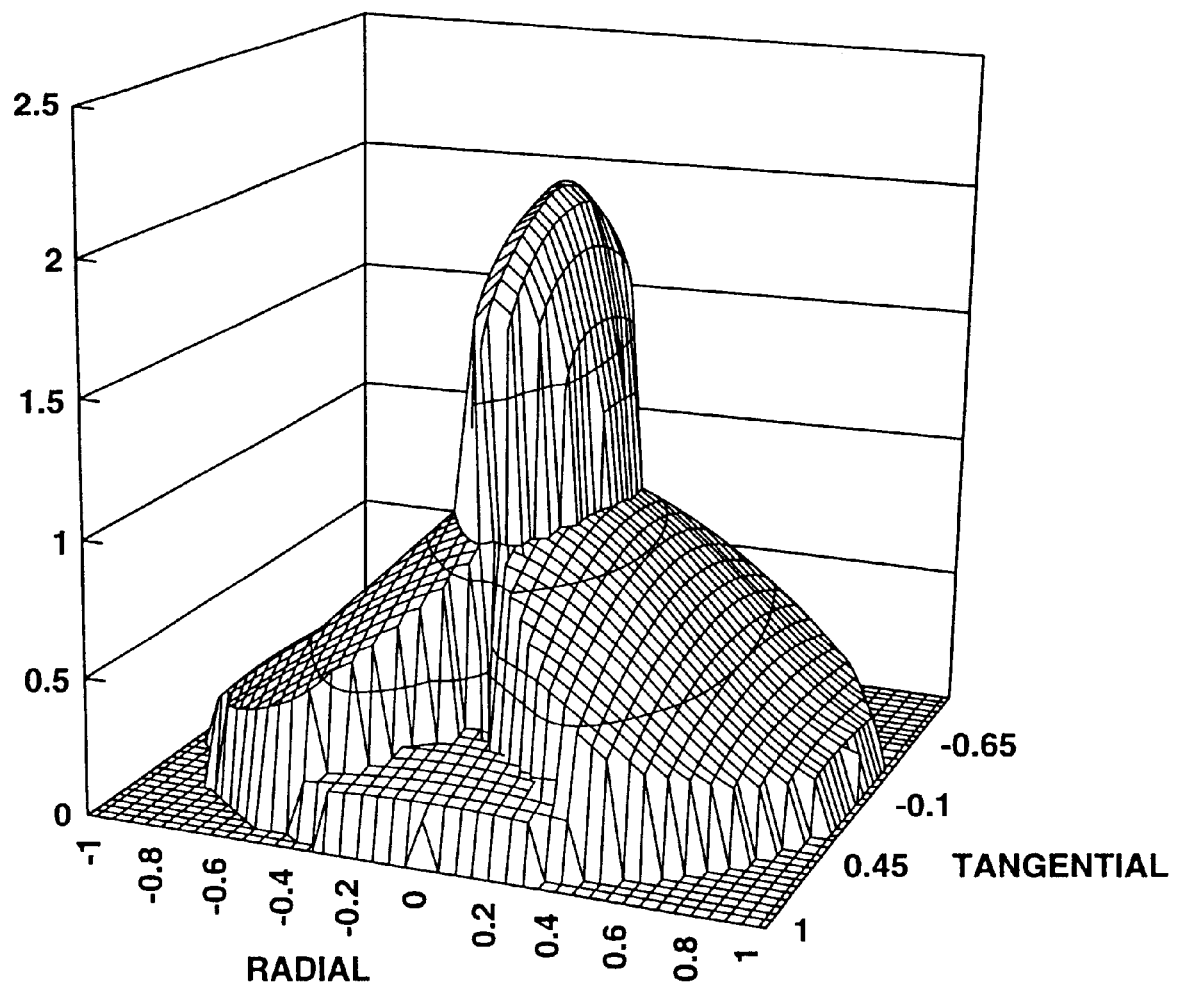
FIG. 17 is a graph showing a result of computing an intensity distribution of diffracted beams from the optical disc onto an objective lens pupil when the optical pickup apparatus uses a DVR optical disc for reproduction, a beam spot is placed on the land, and there is a +0.35 μm defocus on the optical disc.

FIGS. 12 to 17 depict intensity distributions in reflected light beams under the following conditions. FIGS. 12, 14, and 16 show that an optical spot is placed on the groove. FIGS. 13, 15, and 17 show that an optical spot is placed on the land. FIGS. 14 and 15 show an optical spot is focused (no defocusing). FIGS. 12 and 13 show a defocus of −0.35 μm on the optical disc. FIGS. 16 and 17 show a defocus of +0.35 μm on the optical disc.

Further, the land-groove recording system records information signals on both the land and the groove. If a track cycle is conventionally assumed to be a distance between lands or between grooves, the track cycle (track pitch) relative to the spot diameter becomes large. Accordingly, diffracted beams from the optical disc overlap with each other on the objective lens pupil in a manner greatly different from the land recording method and the groove recording method.

Figure 18:
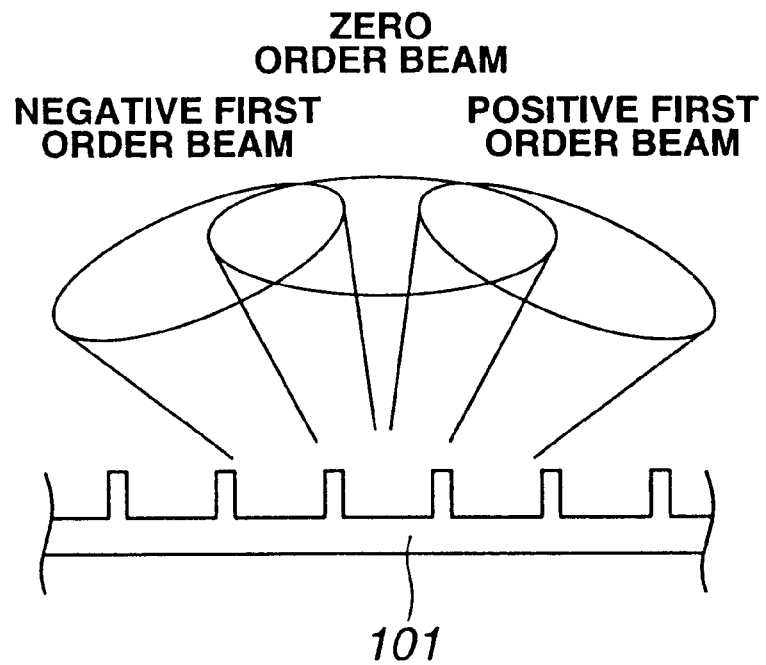
FIG. 18 is a side view showing diffracted beam states on an optical disc according to conventional land recording.
Figure 19:
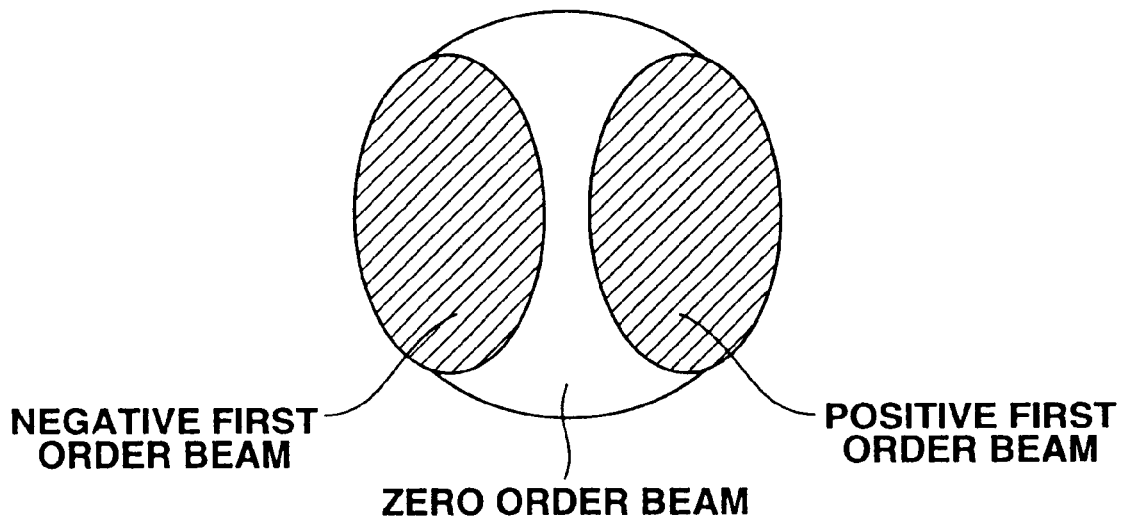
FIG. 19 is a front view showing a state of returning diffracted beams from an optical disc according to the conventional land recording to the optical pickup apparatus.
Figure 20:
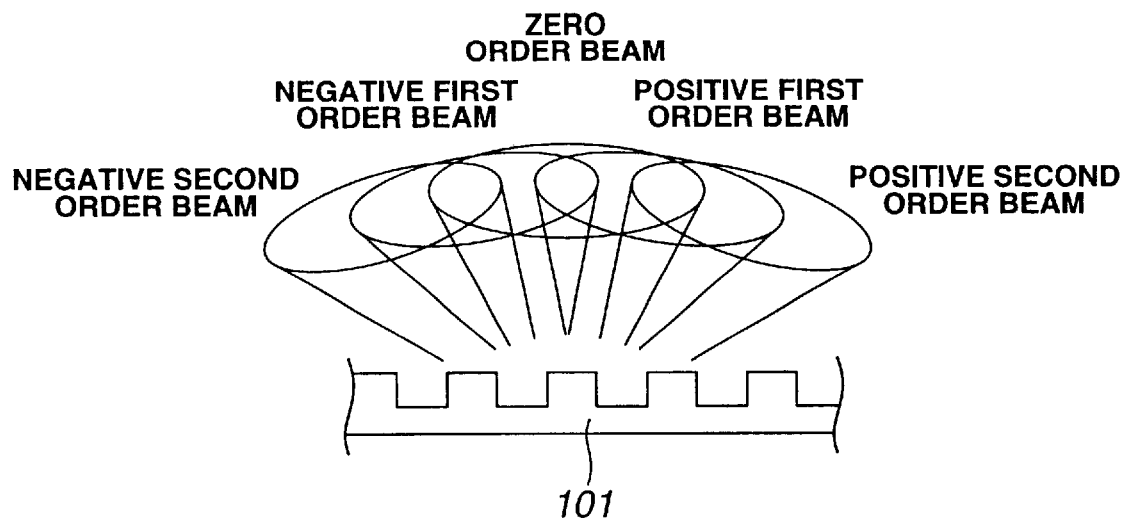
FIG. 20 is a side view showing diffracted beam states on an optical disc according to land-groove recording performed on the optical disc apparatus according to the present invention.
Figure 21:
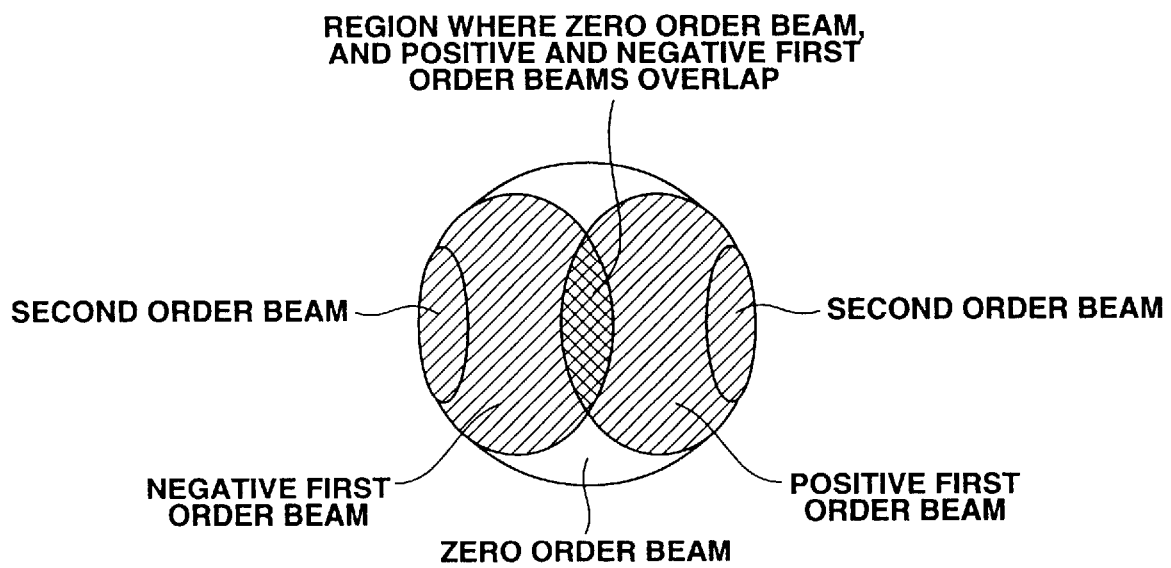
FIG. 21 is a front view showing a state of returning diffracted beams from an optical disc according to the land-groove recording performed on the optical disc apparatus according to the present invention to the optical pickup apparatus.

FIG. 18 shows reproduction of an optical disc using the conventional land recording system. Normally, this reproduction causes no overlapping among a zero order beam, positive and negative first order beams. When the land-groove recording system is used as shown in FIG. 20, however, a track cycle often causes overlapping among a zero order beam, positive and negative first order beams with each other at the center of the pupil. In FIGS. 12, 14, 15, and 17, an overlapping region is represented by a prominent intensity at the center of reflected light beams.

As clearly seen in FIGS. 14 and 15, a focused state (no defocusing) does not change the intensity distribution in the reflected light beams whether the optical spot is placed on the land or the groove. This is a reason why the sum signal cannot be used as a track recognition signal for the land-groove recording system. By contrast, as shown in FIGS. 12, 13, 16, and 17, a defocused state causes an intensity distribution difference in the reflected light beams depending on whether the optical spot is placed on the land or the groove. Moreover, a defocus direction reverses the polarity of changes in the intensity distribution.

Figure 25:
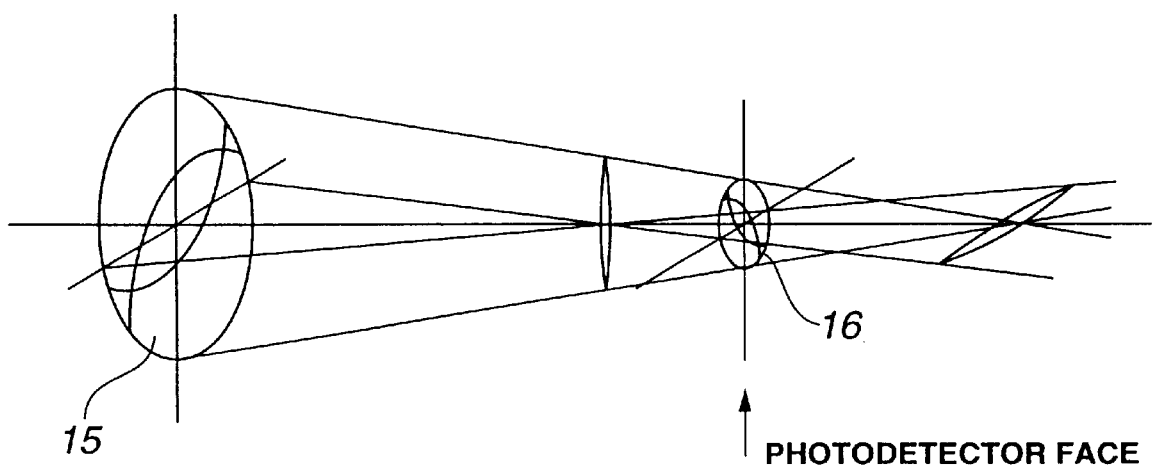
FIG. 25 is a perspective view of varying light beam sections according to the astigmatic method.

The applicants propose the following in Japanese Patent Application Publication No. 11-277544 when the astigmatic method is used for detecting a focus error signal. Namely, the multiple-lens 15 allows the reflected light beam to be subject to astigmatism of 45 degrees against the direction of the diffraction pattern due to the recording track as shown in FIG. 25. As shown in FIG. 25, the light-receiving section of the optical detection element 16 is arranged approximately in the middle of two focal lines formed because the astigmatism occurs. The light-receiving section surface of the light-receiving element 9 is arranged approximately at the middle of a direction causing the astigmatism and a direction which is orthogonal to the aforesaid direction and provides no astigmatism. Namely, the light-receiving section surface is arranged approximately at the middle of the focus and a direction parallel to a generatrix of the cylindrical surface of the multiple-lens 15. When focused, a return beam spot becomes almost a circle and becomes a focal line at both ends of the pull-in range. When the primary light beam is focused on the optical disc, a reflected light beam spot becomes almost a circle on the light-receiving element and becomes a focal line at both ends of the focus pull-in range. Consequently, an S-shaped focus error curve results.

When the primary light beam is focused on the optical disc, there can be provided a diffracted pattern of the reflected light beam on the objective lens pupil and a diffracted pattern on the light-receiving section. A spot is formed with the inverted pattern on the light-receiving section along a direction which causes the beam to focus before reaching the light-receiving section. This direction is orthogonal to the direction parallel to the generatrix for the cylindrical surface of the multiple-lens.

Figure 23:
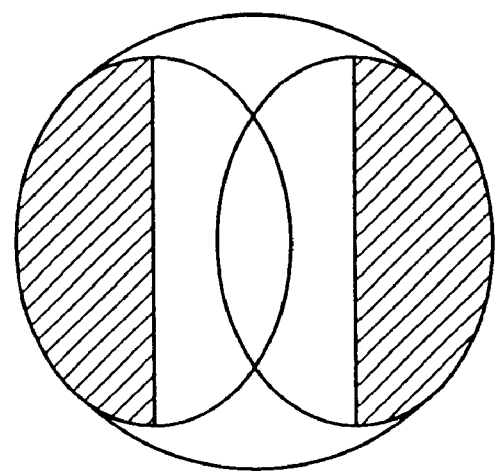
FIG. 23 is a front view schematically showing intensity distribution of light beams reflected from optical spots defocused in another direction on a land-groove recording medium in the optical pickup apparatus according to the present invention.
Figure 24:
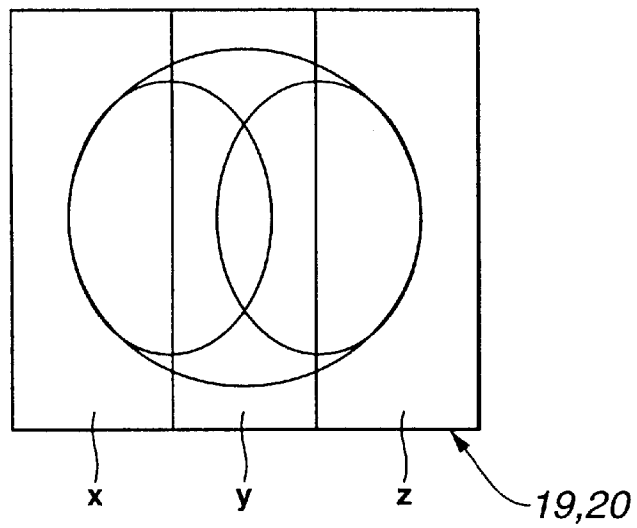
FIG. 24 is a front view showing a configuration of a light-receiving section receiving light beams reflected from optical spots defocused on a land-groove recording medium in the optical pickup apparatus according to the present invention.

Accordingly, when the light-receiving section is configured as shown in FIG. 11, a return light beam can be split and received from the defocusing secondary spot as shown in FIG. 24. In this case, it is possible to obtain a track recognition signal according to the operational equation for the above-mentioned track recognition signal CTS. At this time, it is necessary to use a change in output from each light-receiving section due to a change in the intensity distribution on the land and the groove as shown in FIGS. 22 and 23.

Figure 22:
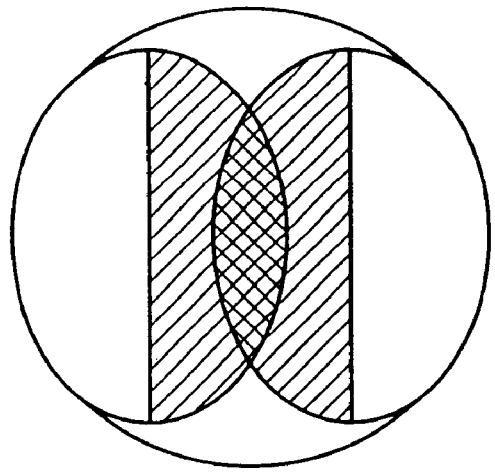
FIG. 22 is a front view schematically showing intensity distribution of light beams reflected from optical spots defocused in one direction on a land-groove recording medium in the optical pickup apparatus according to the present invention.

FIGS. 22 and 23 schematically show changes in the intensity distribution of return light beams from the defocusing secondary spot. In FIG. 22, the intensity at the center increases. In FIG. 23, the intensity at the periphery increases. It is possible to interpret that the intensity varies between the states in FIGS. 22 and 23.

In order to detect such an intensity distribution change as a signal, the light-receiving section comprises a plurality of light-receiving elements as shown in FIG. 11. For example, three light-receiving elements x, y, and z are arranged parallel as shown in FIG. 24. A reflected light beam from the secondary spot is split into three portions, namely, the center and both peripheral ends. When optical detection outputs from these light-receiving elements x, y, and z are assumed to be x, y, and z, the following operation is performed.

$$(y) \text{ or } (x+z) \text{ or } (x+z)-y$$

Figure 26:
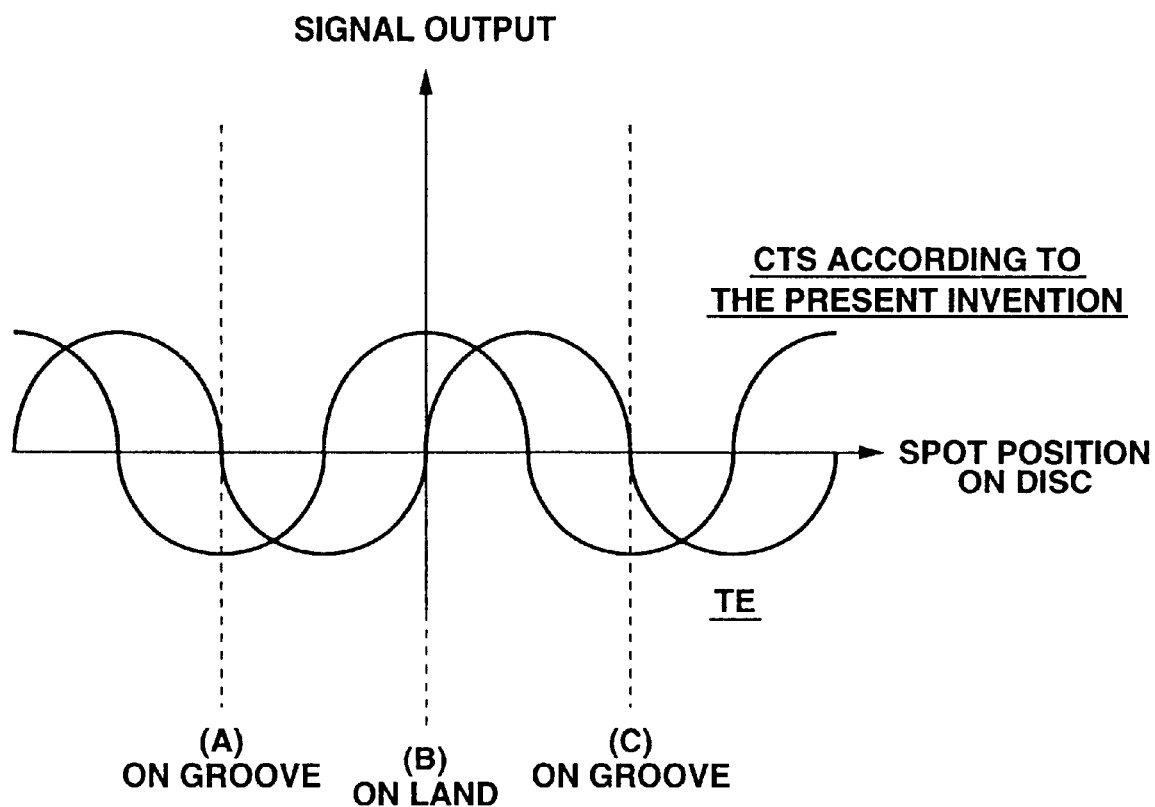
FIG. 26 is a graph showing a track recognition signal detected by a track recognition signal detection method according to the present invention.

For an actual light-receiving element, this operation corresponds to the above-mentioned operational equation $\{(e+f)-i\}-\{(g+h)-j\}$. FIG. 26 shows an intensity distribution change within the optical spot when the track recognition signal is detected; and a change in the track recognition signal at that tine. As shown in this figure, the cyclic change causes a phase shift for a quarter track pitch.

It is desirable to maintain the positional relation between the primary and secondary spots on the optical disc so that the secondary spot is positioned to the land when the primary spot is positioned to the groove. When an operation for finding the tracking error signal differs from that mentioned above, it may be preferable to position both the primary and secondary spots to the groove. In this case, the track recognition signal's polarity reverses.

The following equation needs to be satisfied in order to provide the above-mentioned positional relation between the primary and secondary spots on the optical disc.

$$S \approx Tp \cdot n/2$$

where S is an absolute value for a distance up to the primary spot in the normal line direction of recording tracks formed on the signal recording surface of the optical disc, Tp is a track pitch of the recording track, and n is an integer. Especially, it is desirable to form the secondary spots on two positions which satisfy the following equation.

$$S \approx +P/2$$

$$S \approx -P/2$$

The secondary spots need not be formed symmetrically with respect to the primary spot.

$$S \approx +nP/2$$

$$S \approx -mP/2$$

where n>m, n<m, or n=m.

Figure 27:
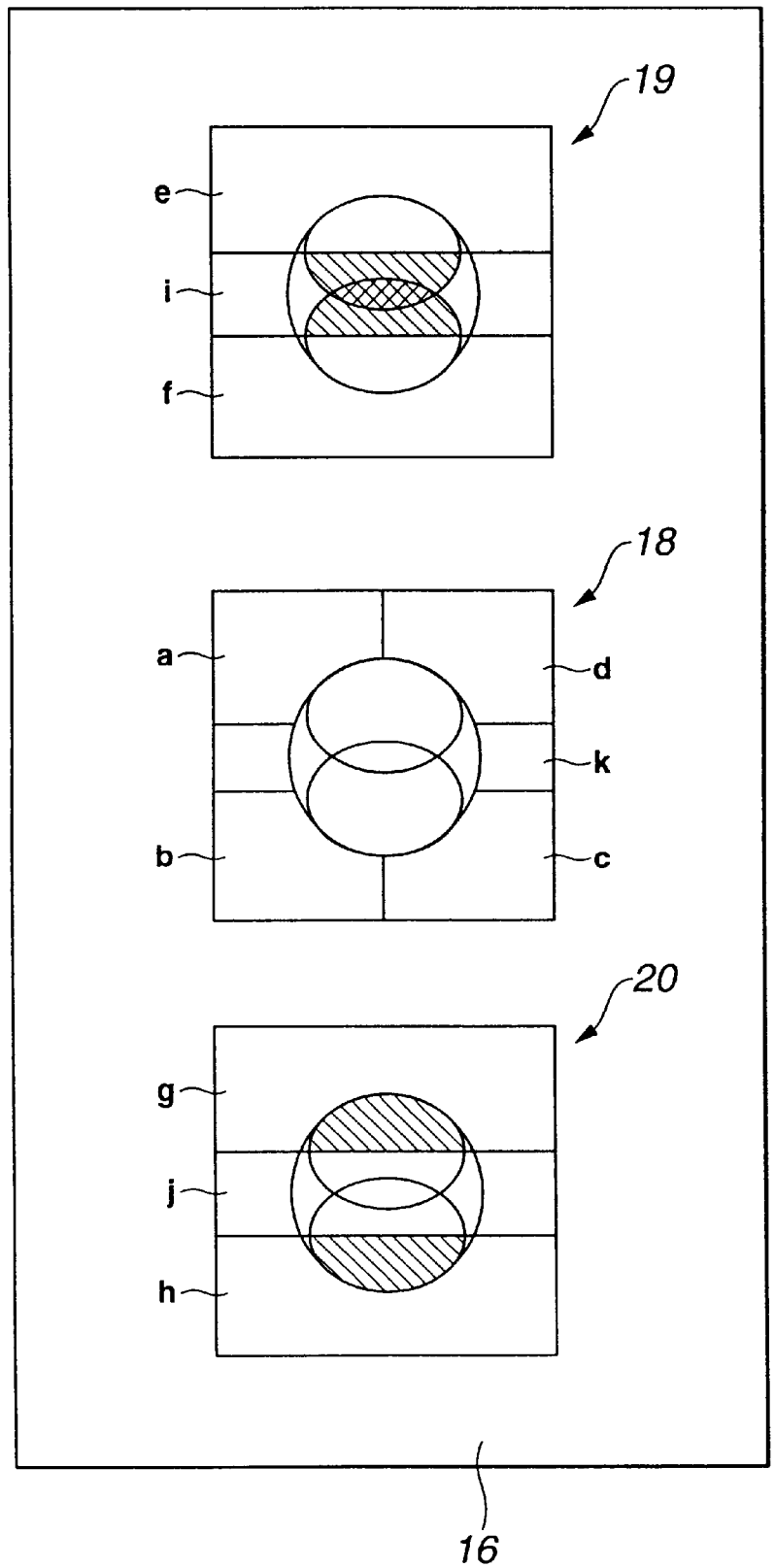
FIG. 27 is a front view showing a state of spots on the optical detection element when the above-mentioned track recognition signal produces the minimum value.
Figure 28:
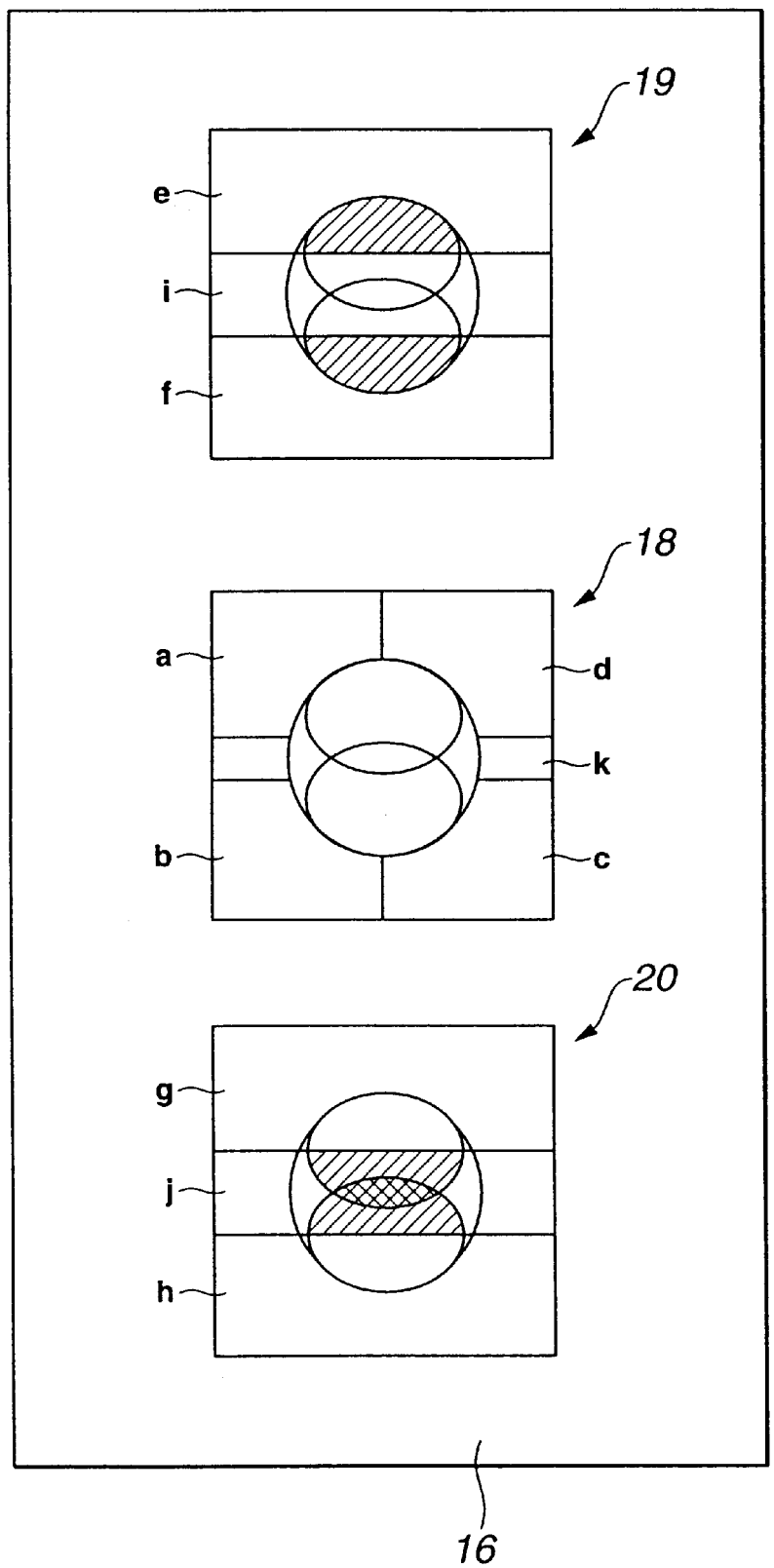
FIG. 28 is a front view showing a state of spots on the optical detection element when the above-mentioned track recognition signal produces the maximum value.
Figure 29:
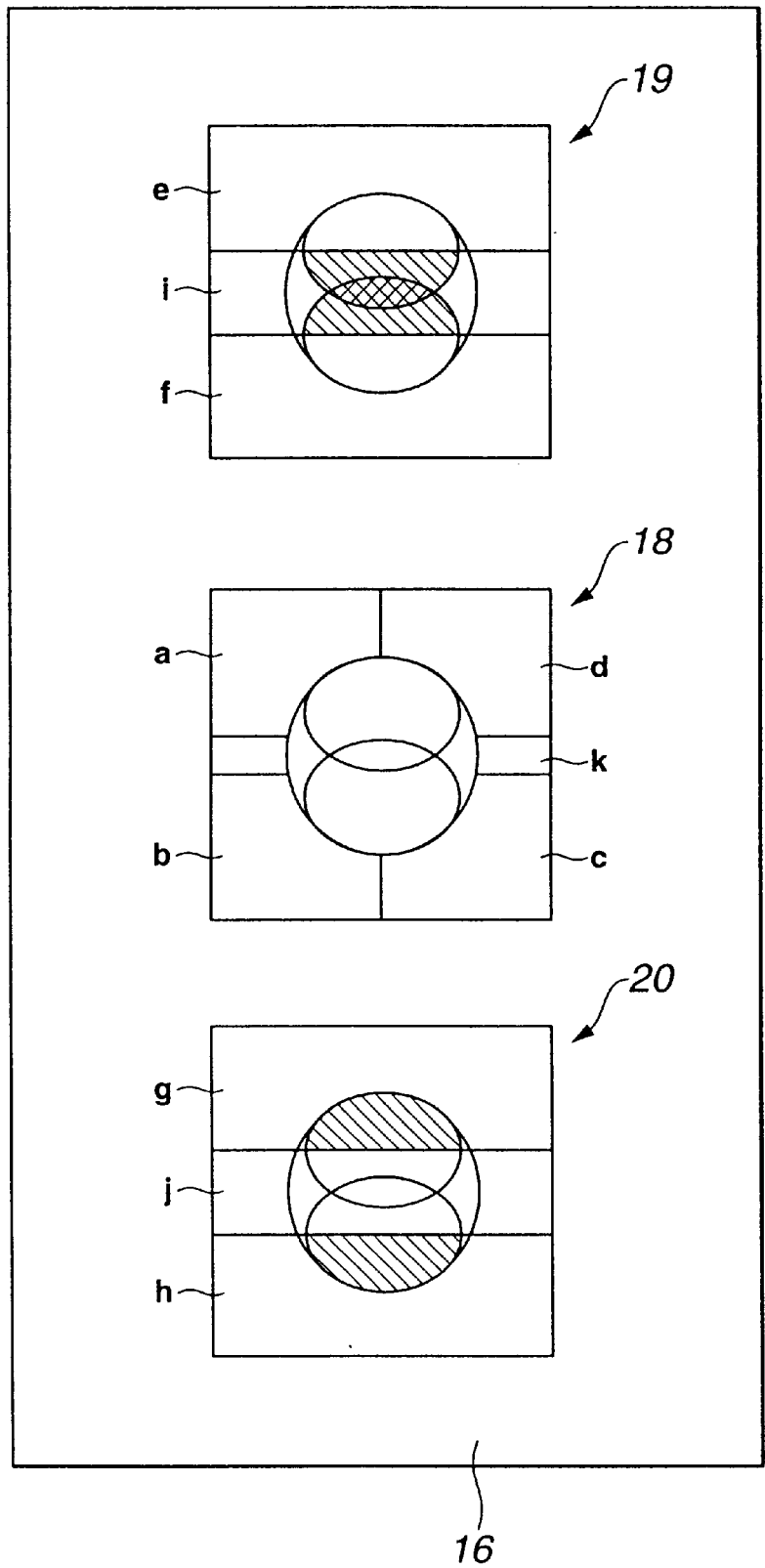
FIG. 29 is a front view showing a state of spots on the optical detection element when the above-mentioned track recognition signal again produces the minimum value.

As shown in FIG. 26, the track recognition signal (CTS signal) causes a phase shift for a quarter cycle with respect to the tracking error signal TE when a distance between grooves is assumed to be one cycle. States (A) and (C) in FIG. 26 minimize the track recognition signal. In these states, a reflected light beam from one secondary spot causes a high optical intensity at the center as shown in FIGS. 27 and 29. Further, a reflected light beam from the other secondary spot causes a high optical intensity at the periphery. By contrast, state (B) in FIG. 26 maximizes the track recognition signal. In this state, a reflected light beam from one secondary spot causes a high optical intensity at the periphery as shown in FIG. 28. Further, a reflected light beam from the other secondary spot causes a high optical intensity at the center.

This track recognition signal (CTS signal) can be found by using the following operations. When using a light source having a plurality of light generation points, for example, it is possible to use any one of the following operations by using only either secondary spot for decreasing the number of light generation points needed.

$$CTS = (-i)$$

$$CTS = (e+f)$$

$$CTS = (e+f) - i$$

According to these operations, however, the track recognition signal causes an offset similar to a direct current (DC offset). Further, a slight defocus decreases the contrast for intensity changes due to the land and the groove, decreasing an amplitude for the track recognition signal. For solving these problems, it is possible to find a stable track recognition signal according to any one of the following operations by using both the first and second secondary spots.

$$CTS = (-i) - (j)$$

$$CTS = (e+f) - (g+h)$$

$$CTS = \{(e+f) - i\} - K \cdot \{(g+h) - j\}$$

Value K in this equation is used for avoiding effects due to a groove depth, or a slight positional deviation or a light volume difference in virtual light generation points formed by a hologram pattern.

By generating the track recognition signal as mentioned above, it is possible to use various conventional tracking control methods for implementing the land-groove recording system which uses an optical disc having almost the same width for the land and the groove. The conventional tracking control methods include those applied to the land recording system or the groove recording system.

When the track recognition signal is obtained as mentioned above, the use of this signal as a CPI signal for conventional tracking control implements a tracking servo pull-in operation and the count of track traverses and directions (traverse count). The CPI signal has a phase difference for a quarter track cycle with respect to the tracking error signal. Conventionally, the CPI signal is used for a tracking servo pull-in operation and the count of track traverses in the land or groove recording system.

The following describes a comparison between the optical disc apparatus according to the present invention and the optical disc apparatus described in Japanese Patent Application Laid-Open Publication No. 11-45451. The description below concerns results of comparing amplitude variations in the tracking error signal and the track recognition signal. One condition is that a movement direction of the optical pickup apparatus deviates from the radial direction of the optical disc. Another condition is that the optical disc causes a large eccentricity.

Figure 31:
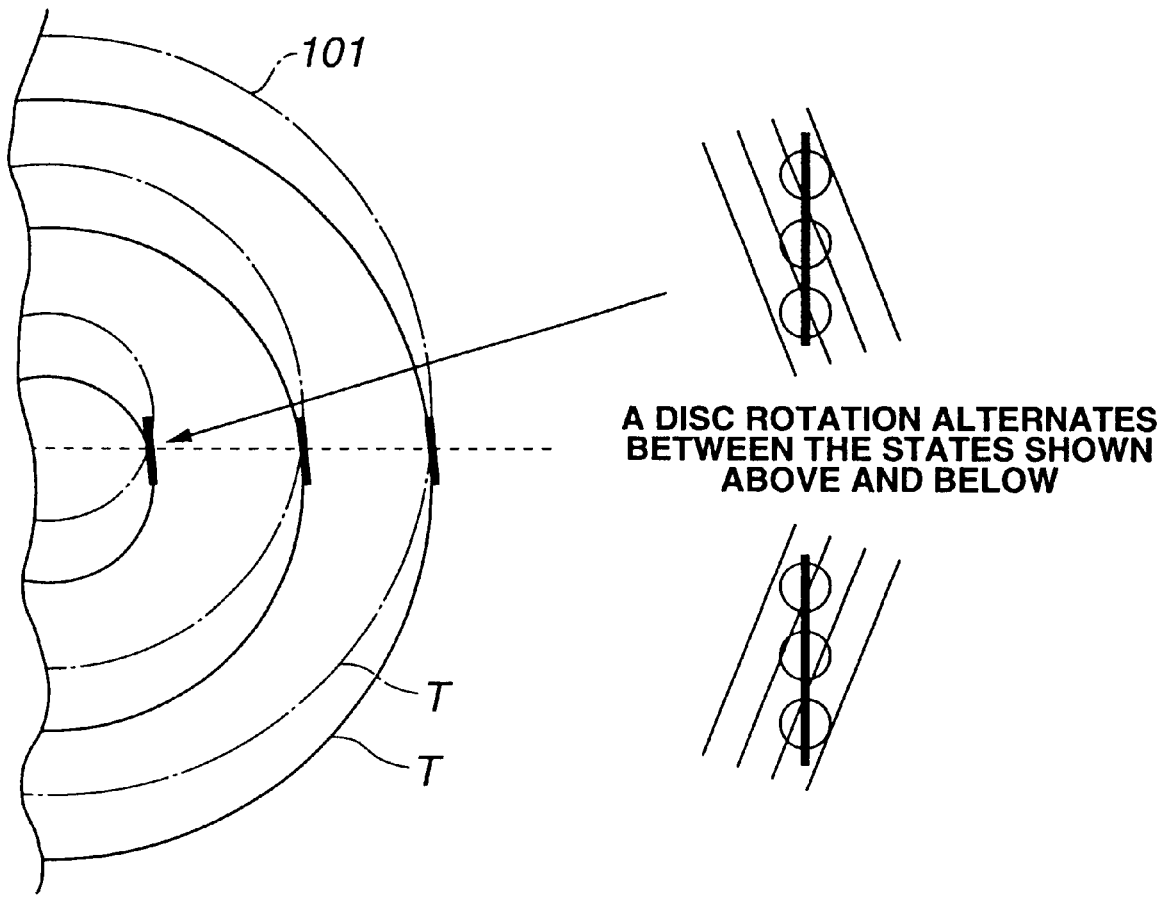
FIG. 31 is a plan view showing relation among recording tracks and arrangement directions of primary and secondary spots on an optical disc when the optical disc causes eccentricity.

FIG. 31 illustrates the case where a movement direction of the optical pickup apparatus deviates from the radial direction of the optical disc. As shown in this figure, inner and outer peripheries of the optical disc 101 change the relation between the recording track T and the secondary spot, namely the track phase. FIG. 31 also illustrates the case where the optical disc causes a large eccentricity. Also in this case, a revolution of the optical disc 101 changes the relation between the recording track T and the secondary spot (track phase). The diagrams in FIG. 27 are slightly exaggerated for easy understanding of changes.

These phenomena easily occur during manufacture of optical disc apparatuses and affect the system. It is possible to determine to what degree the system is affected by examining changes in the tracking error signal and the track recognition signal due to track phase deviations.

Figure 30:
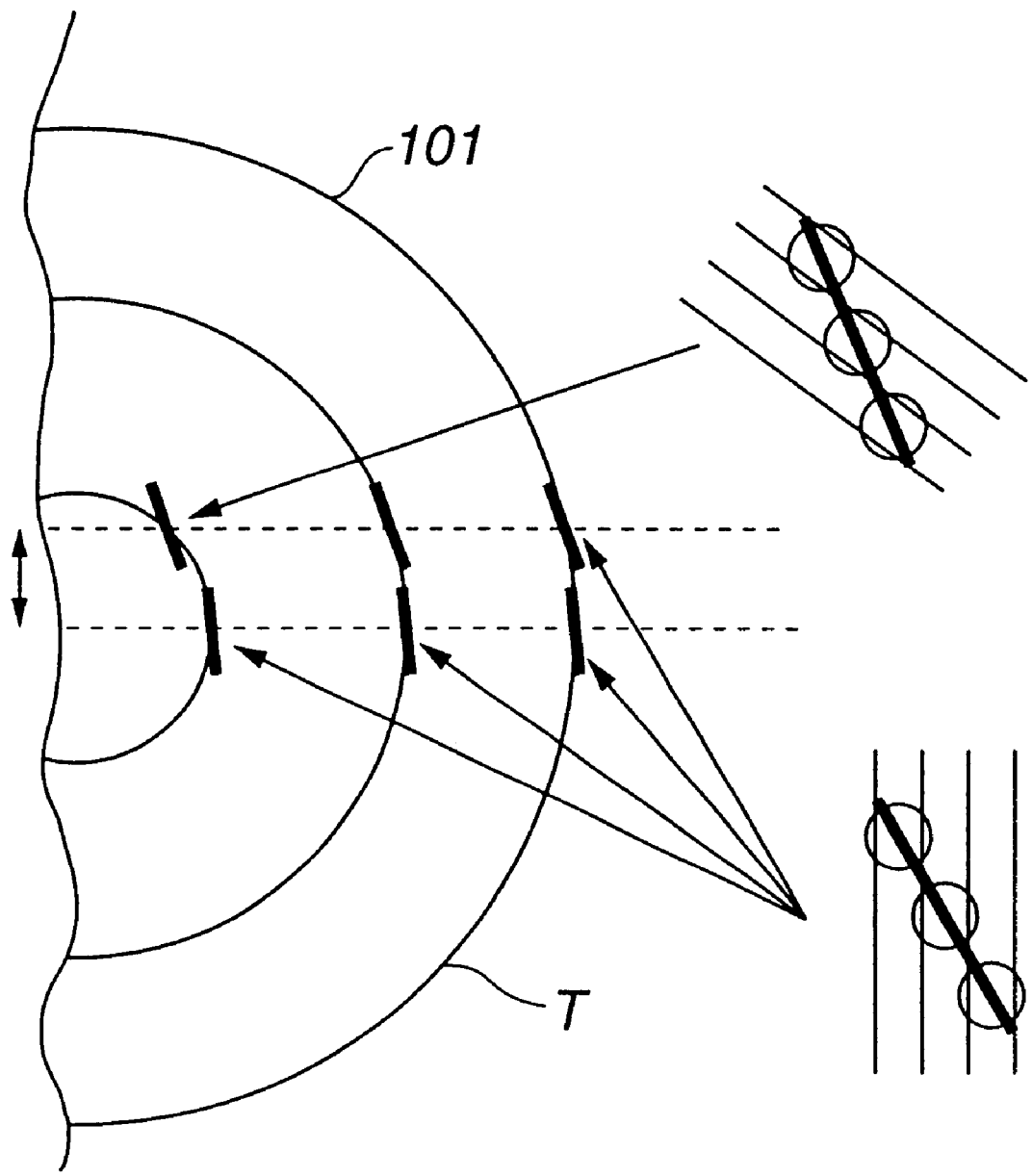
FIG. 30 is a plan view showing relation among recording tracks and arrangement directions of primary and secondary spots on an optical disc when a movement direction of the optical pickup apparatus deviates from a radial direction of the optical disc.

When a DVR disc is reproduced, both the optical disc apparatuses cause an amplitude variation in the tracking error signal and the track recognition signal along inner and outer peripheries at the same interval between the primary spot and the secondary spot. Graphs in FIG. 32 show how this amplitude variation deteriorates depending on deviation amount L in FIG. 30 between a movement direction of the optical pickup apparatus and the radial direction of the optical disc.

Figure 32:
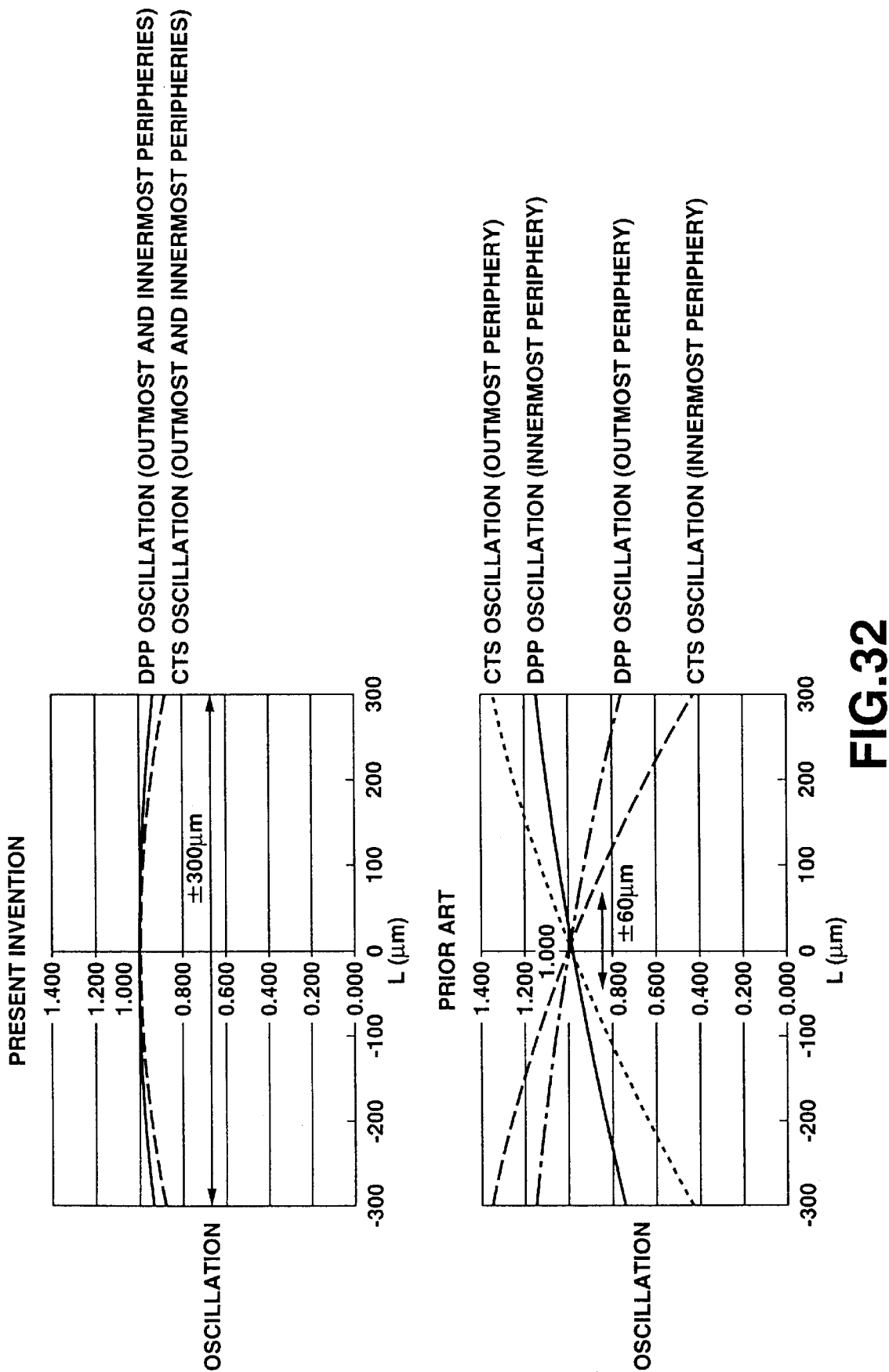
FIG. 32 is a graph showing relation among amplitude variations of a tracking error signal and a track recognition signal on inner and outer peripheries and amounts of deviation between movement directions of the optical pickup apparatus and radial directions of the optical disc with respect to the optical disc apparatus according to the present invention and the conventional optical disc apparatus.
Figure 34:
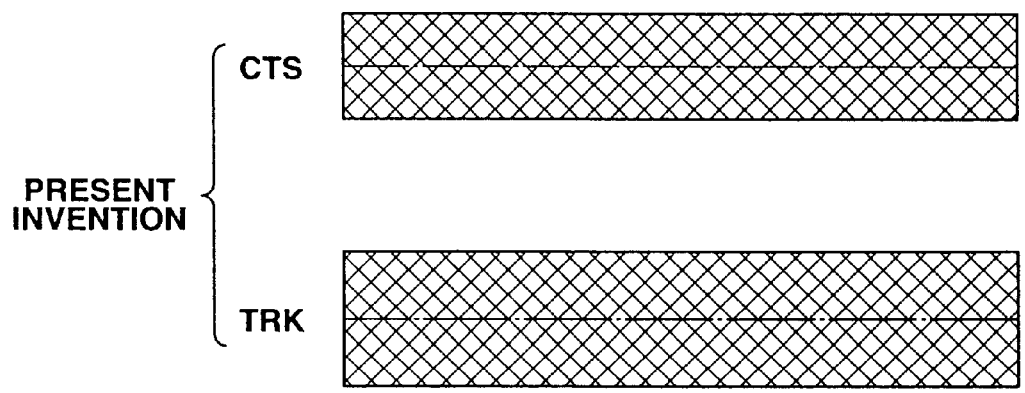
FIG. 34 is a graph showing amplitude variations of a tracking error signal and a track recognition signal when an optical disc causes eccentricity in the optical disc apparatus according to the present invention.
Figure 35:
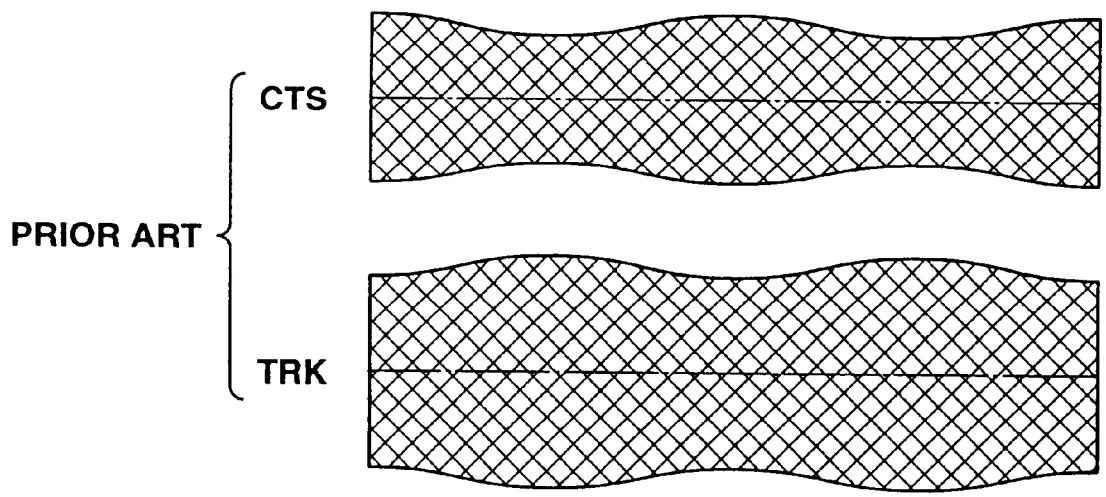
FIG. 35 is a graph showing amplitude variations of a tracking error signal and a track recognition signal when an optical disc causes eccentricity in the conventional optical disc apparatus.

FIG. 32 makes it clear that the optical disc according to the present invention is approximately five times less sensitive to a deviation than the prior art. The optical disc apparatus described in Japanese Patent Application Laid-Open Publication No. 11-45451 is characterized by a ¼-track pitch deviation between the primary and secondary spots. With this state unchanged, the tracking error signal causes a large amplitude variation. Consequently, the comparison is based on a ⅜-track pitch deviation so as to balance amplitude variations in the tracking error signal and the track recognition signal. Also in the case of a large eccentricity, an oscilloscope is used to measure changes in the tracking error signal and the track recognition signal on both the optical disc apparatuses under the similar conditions. FIGS. 34 and 35 diagram comparison results of the actual measurements. In these figures, the abscissa axis corresponds to time and the ordinate axis corresponds to amplitude. It is understood that the optical disc apparatus according to the present invention causes a little amplitude variation.

Figure 33:
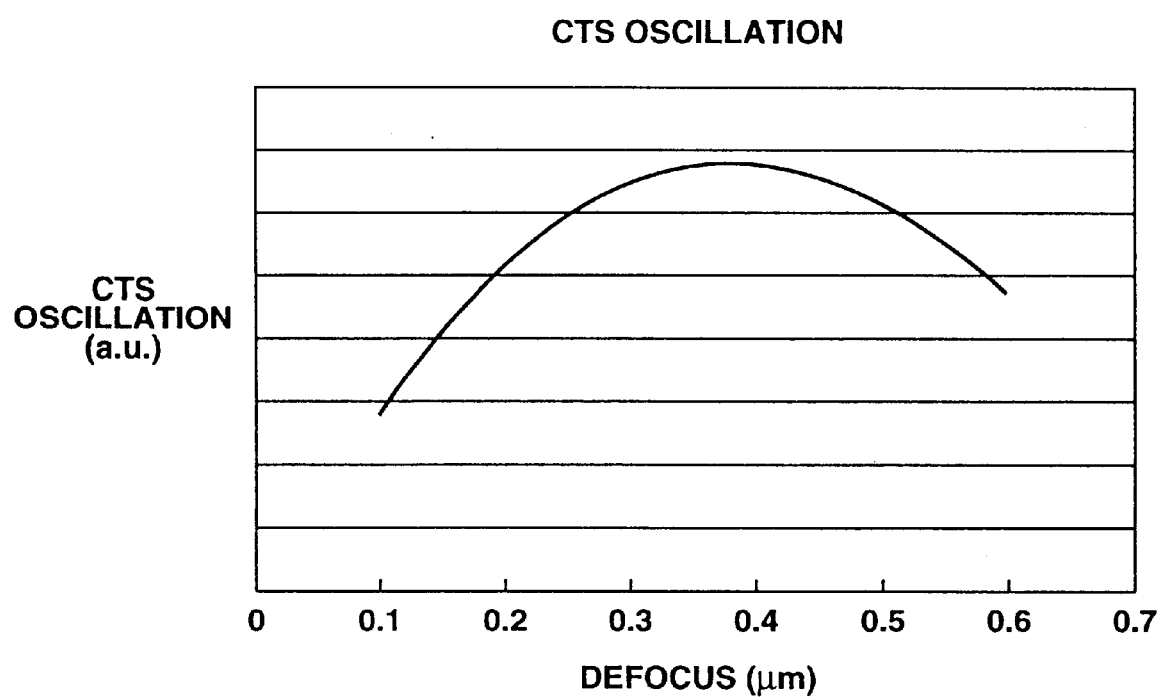
FIG. 33 is a graph showing relation between a track recognition signal amplitude and a secondary spot defocus amount.

The following describes a defocus amount applied to the secondary spot. For compatibility with a new disc format, it is important to set appropriate defocus amounts depending on different formats when a system margin is considered. In the track recognition signal detection method according to the present invention, for example, a track recognition signal amplitude varies with a defocus amount for the secondary spot as shown in FIG. 33.

When the optical disc slants in the direction of secondary spots arranged, the track recognition signal detection method according to the present invention changes a defocus amount for the secondary spot, fluctuating a track recognition signal amplitude. Including other external disturbances, it is desirable to set the defocus amount applied to secondary spots so that the track recognition signal amplitude can be maximized. Further, it is desirable to set the defocus amount applied to an appropriate secondary spot based on an amount which can maximize the track recognition signal amplitude.

The following describes derivation of relational equations for finding a defocus amount which should provide the maximum track recognition signal amplitude.

The intensity distribution within an optical spot depends on how the pupil is subject to the phase relation on the wave surface among beams diffracted by the land-groove structure, especially among a zero order beam and positive and negative first order beams. Namely, variation of defocus diffraction patterns on the pupil is independent of the numerical aperture (NA) of the objective lens and wavelength $\lambda$. The Fringe-Zernike polynomial capable of representing a wave surface provides a defocus term called the Z4 term. When the Z4 term is used, the defocus amount providing the maximum track recognition signal amplitude becomes a value independent of the numerical aperture (NA) and the wavelength $\lambda$.

As shown in equation (1) below, a value for the defocus term (Z4 term) is converted to defocus amount Def ($\mu$m) by using the numerical aperture (NA) and the wavelength $\lambda$ ($\mu$m).

$$Def\ (\mu m) = \lambda\ (\mu m)/\{1-\cos(\sin^{-1} NA)\} \quad (1)$$

A value Def0 ($\mu$m) expressing a defocus amount providing the maximum track recognition signal is considered to be:

$$Def0\ (\mu m) \propto \lambda\ (\mu m)/\{1-\cos(\sin^{-1} NA)\} \quad (2)$$

Further, Def0 is also considered to vary with states of overlapping among the zero order beam and positive and negative first order beams in reflected light beams from the optical disc.

Figure 36:
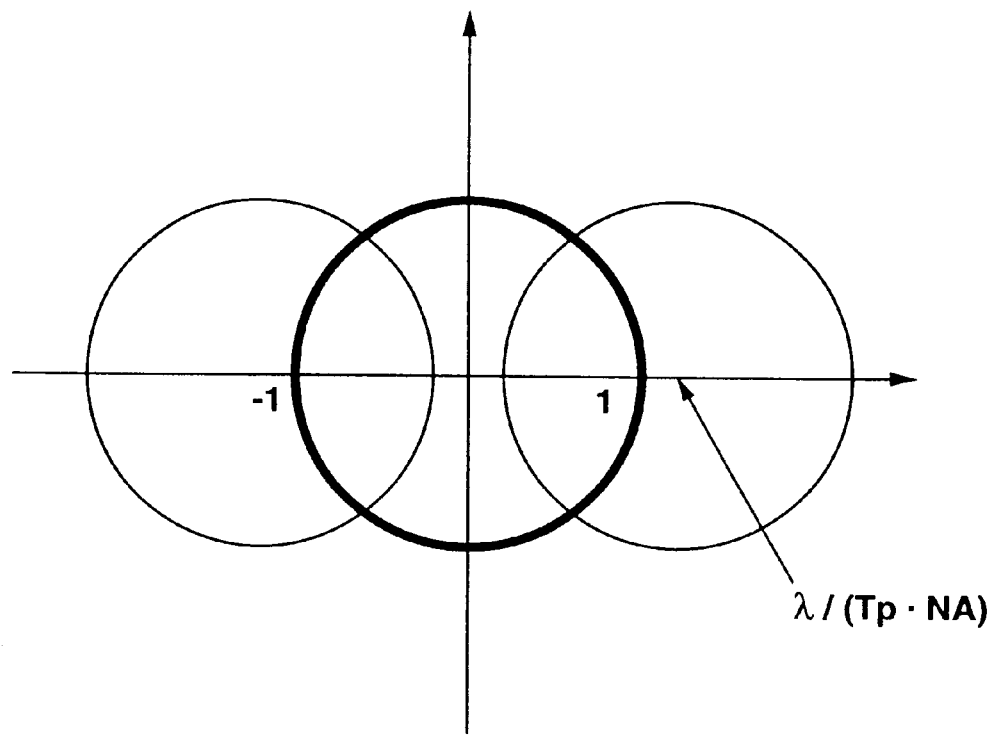
FIG. 36 is a front view showing how much positive and negative first order beams are offset from a pupil represented by a unit circle in the above-mentioned optical pickup apparatus.
Figure 38:
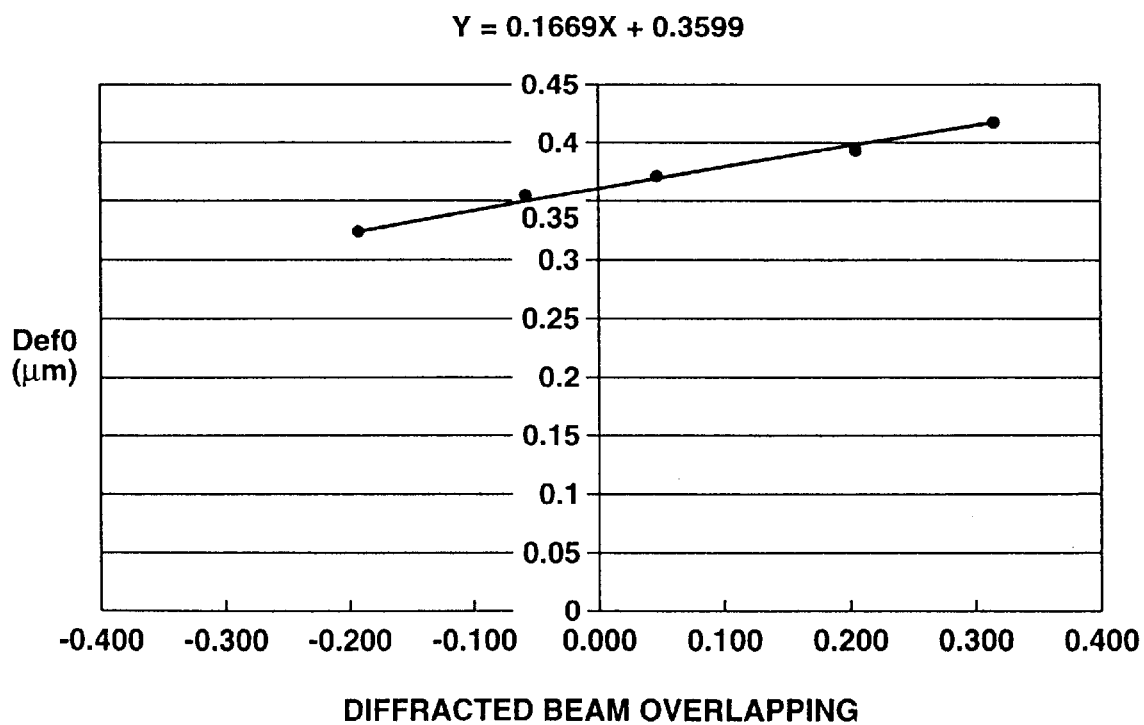
FIG. 38 is a graph showing relation between $\lambda/(Tp \cdot NA)$ and Def0 in a first combination of a wavelength ($\mu$m) and a numerical aperture (NA)
Figure 39:
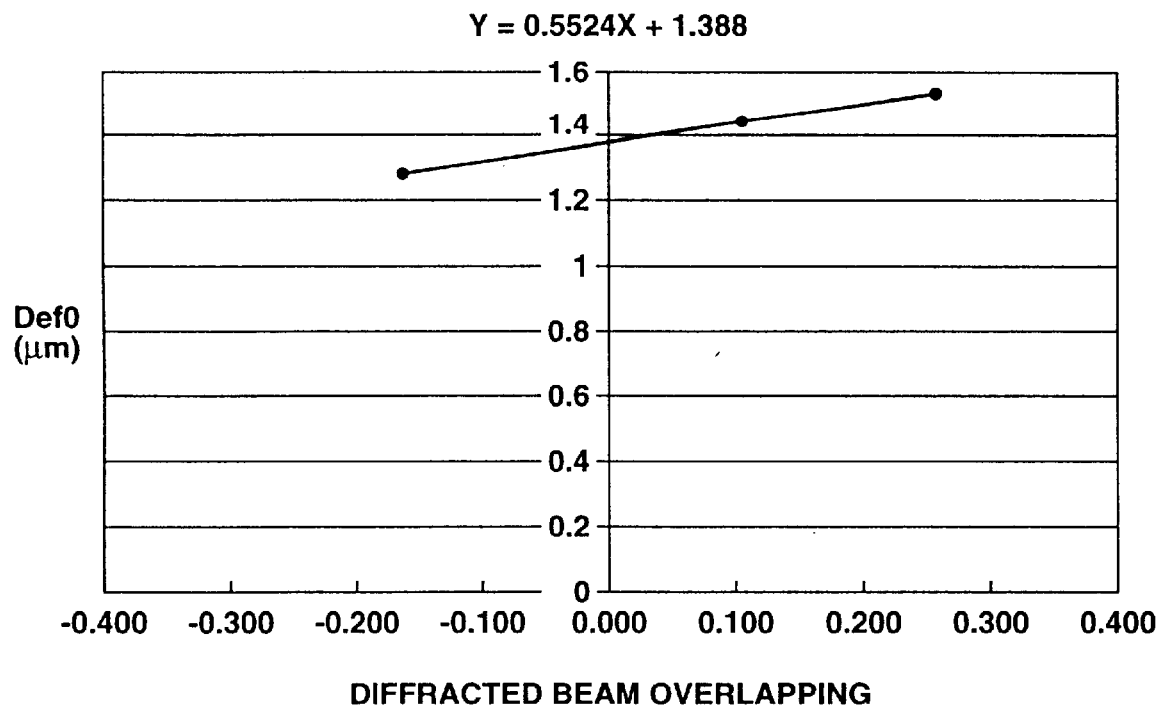
FIG. 39 is a graph showing relation between $\lambda/(Tp \cdot NA)$ and Def0 in a second combination of a wavelength $\lambda$ ($\mu$m) and a numerical aperture (NA)
Figure 40:
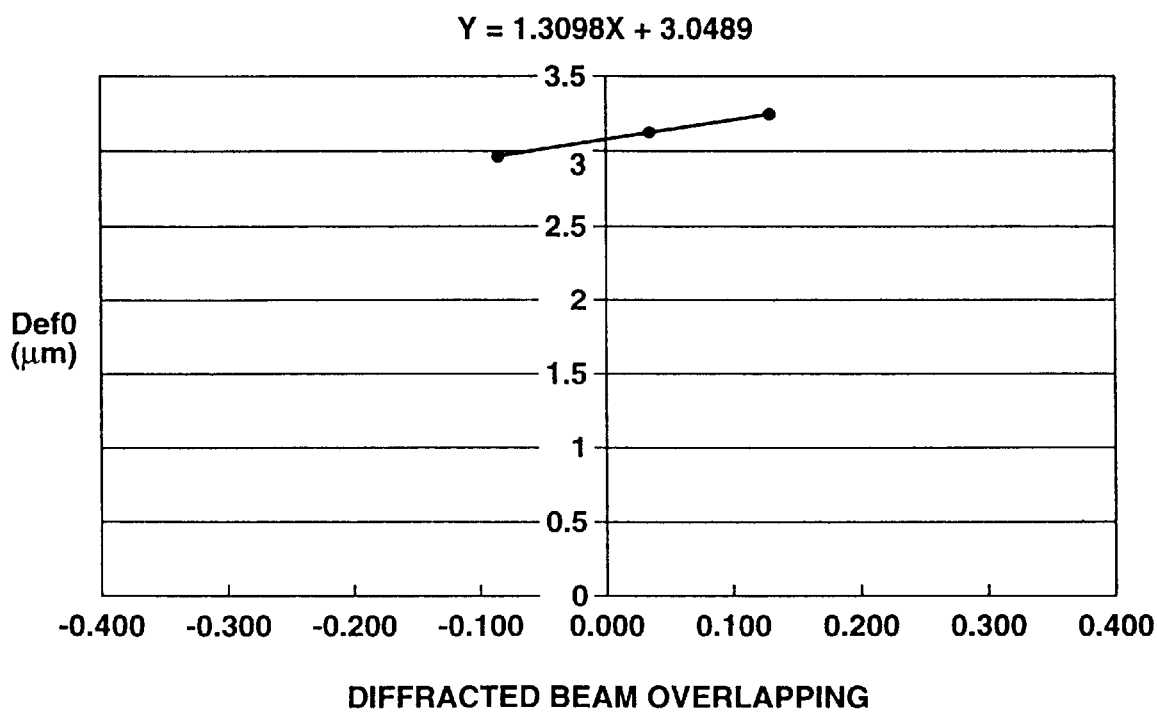
FIG. 40 is a graph showing relation between $\lambda/(Tp \cdot NA)$ and Def0 in a third combination of a wavelength $\lambda$ ($\mu$m) and a numerical aperture (NA)

Track pitch Tp is a width between lands and is varied with respect to the following three combinations of wavelength $\lambda$ ($\mu$m) and numerical aperture (NA). As shown in FIGS. 38 to 40, a simulation is performed to find Def0 changes when $\lambda/(Tp \cdot NA)$ is varied. Values used for the three combinations are ($\lambda$, NA)=(0.405, 0.85), ($\lambda$, NA)=(0.66, 0.6), and ($\lambda$, NA)=(0.78, 0.45). Here, as shown in FIG. 36, $\lambda/(Tp \cdot NA)$ denotes an amount indicating how much positive and negative first order beams offset on the pupil represented by a unit circle.

In FIGS. 38 to 40, the abscissa axis represents $(1-\lambda/(Tp \cdot NA))$ and the ordinate axis represents Def0 ($\mu$m). For simplicity of discussion, the graphs show linear approximate expressions assuming that Def0 linearly varies within the range of 1±0.4 for $(1-\lambda/(Tp \cdot NA))$. Namely, FIG. 38 shows equation (3). FIG. 39 shows equation (4). FIG. 40 shows equation (5).

$$Y=0.1669X+0.3599 \quad (3)$$

$$Y=0.5524X+1.388 \quad (4)$$

$$Y=1.3098X+3.0489 \quad (5)$$

Figure 41:
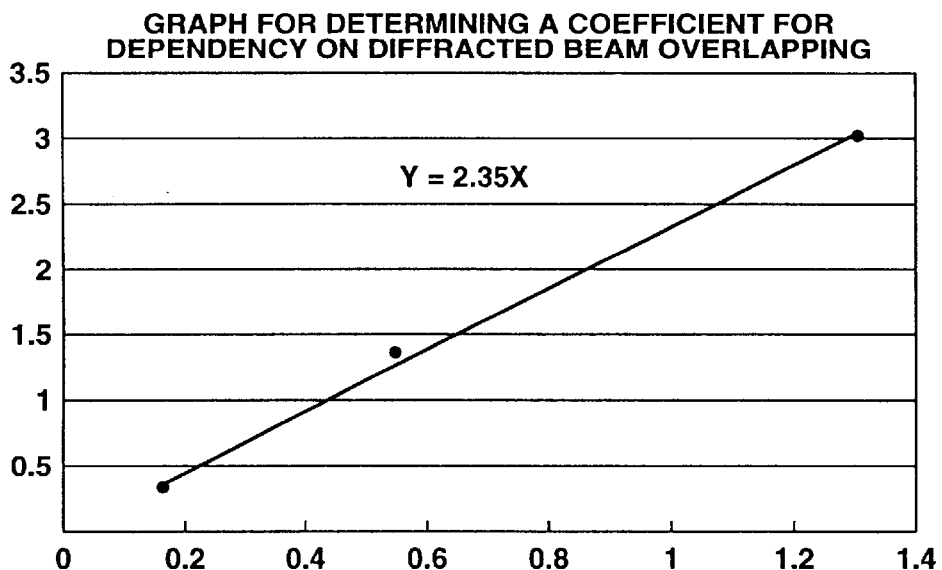
FIG. 41 is a graph showing an equation which generalizes the graphs in FIGS. 38 to 40.

These results are used to find a ratio of values for the zero order term of X and the first order term of X. The graph in FIG. 41 plots values for the first order term of X along the abscissa axis and for the zero order term of X along the ordinate axis. Accordingly, the graphs in FIGS. 38 to 40 are generalized to equation (6) below.

$$Y=K1 \cdot (X+2.35)\ \text{(where } K1 \text{ is a coefficient)} \quad (6)$$

As mentioned above, the following equation (7) can be formulated.

$$K1=K2 \cdot \lambda/\{1-\cos(\sin^{-1} NA)\} \quad (7)$$

This can be formulated as equation (8) below.

$$Def0=K2 \cdot \lambda/\{1-\cos(\sin^{-1} NA)\}[\{1-\lambda/(Tp \cdot NA)\}+2.35] \quad (8)$$

Figure 42:
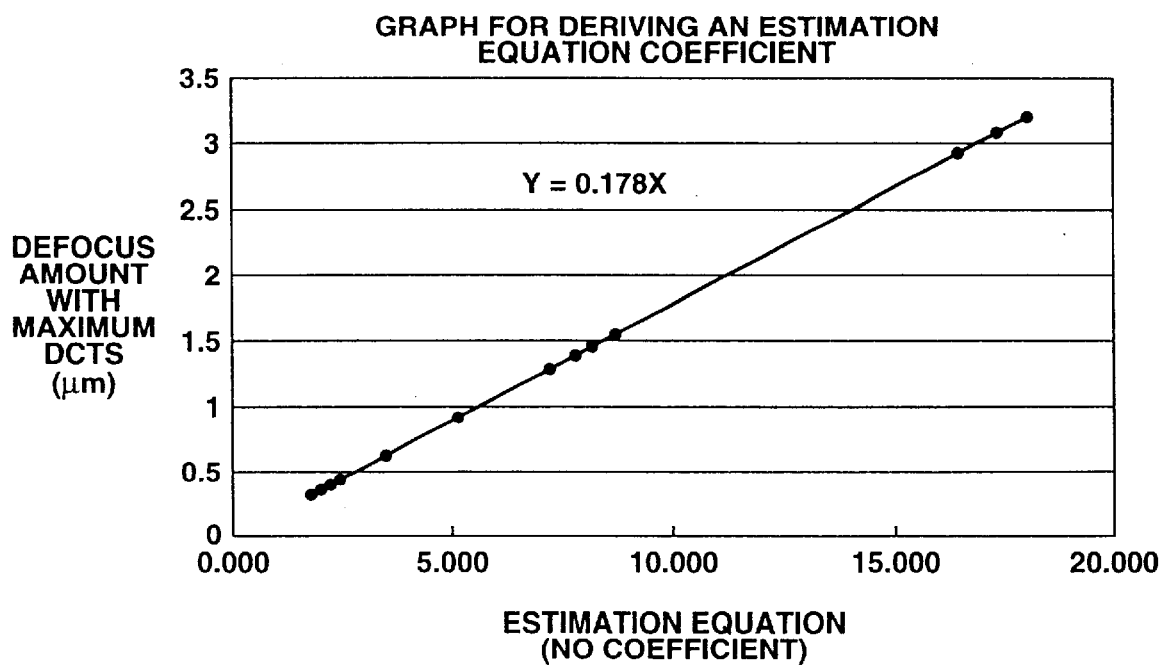
FIG. 42 is a graph showing generalized relation between a Def0 value and $\mu/\{1-\cos(\sin^{-1} NA)\}[\{1-\lambda/(Tp \cdot NA)\}+2.35]$.

For plotting of the graph in FIG. 42, the ordinate axis represents Def0 values found by the simulation including conditions indicated in FIGS. 38 to 40 as mentioned above and other formats reported to be currently under development. The abscissa axis represents $\lambda/\{1-\cos(\sin^{-1} NA)\}[\{1-\lambda/(Tp \cdot NA)\}+2.35]$. The gradient of this graph derives K2=0.178.

Consequently, it is derived that Def0 ($\mu$m) representing defocus amount to be maximum with respect to the track recognition signal on the basis of an outcome of the simulation is defined by the following equation (9) with respect to wavelength $\lambda$ ($\mu$m), track pitch Tp ($\mu$m), and numerical aperture NA.

$$Def0=0.178\lambda/\{1-\cos(\sin^{-1} NA)\}[\{1-\lambda/(Tp \cdot NA)\}+2.35] \quad (9)$$

When setting an actual defocus amount, it is desirable to fine-adjust the amount within the range from approximately 0.4 to 1.7 times Def0. At this time, it is necessary to consider an effect of variations in the defocus amount due to a skew, amplitude variations of the tracking error signal due to secondary spot defocusing, and the like. Within this range, as seen from FIG. 33, it is possible to ensure a track recognition signal amplitude for 60% or more of a defocus amount for the maximum amplitude, causing no particular problem.

In FIG. 33, defocus amount Def0 corresponds to the maximum amplitude (CTS amplitude on the ordinate axis) for the track recognition signal. In this case, Def0 is approximately 0.37 $\mu$m. Conditions applied to FIG. 33 are ($\lambda$, NA, Tp)=(0.4 ($\mu$m), 0.85, 0.6 ($\mu$p)). Also when different values are used for ($\lambda$, NA, Tp), there is provided a relation similar to that in FIG. 33 between the CTS amplitude and the defocus amount based on Def0.

Figure 1:
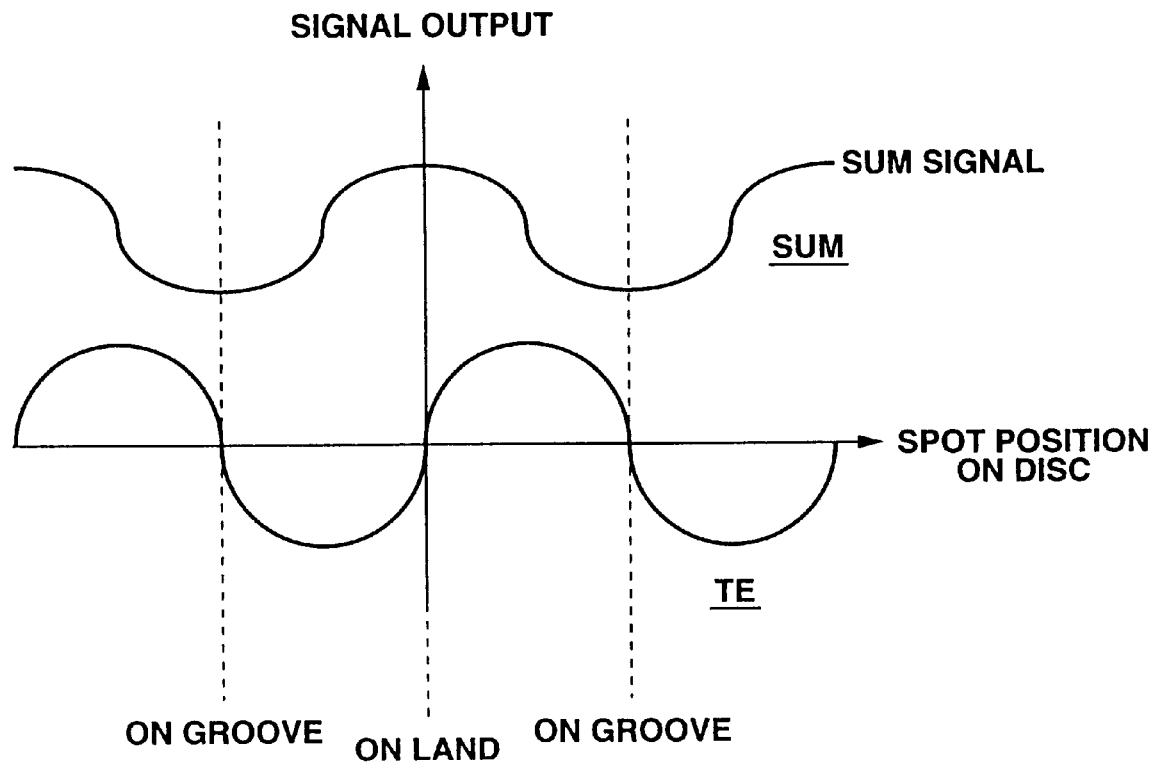
FIG. 1 is a graph showing relation between a tracking error signal and a sum signal according to the conventional land recording system.
Figure 2:
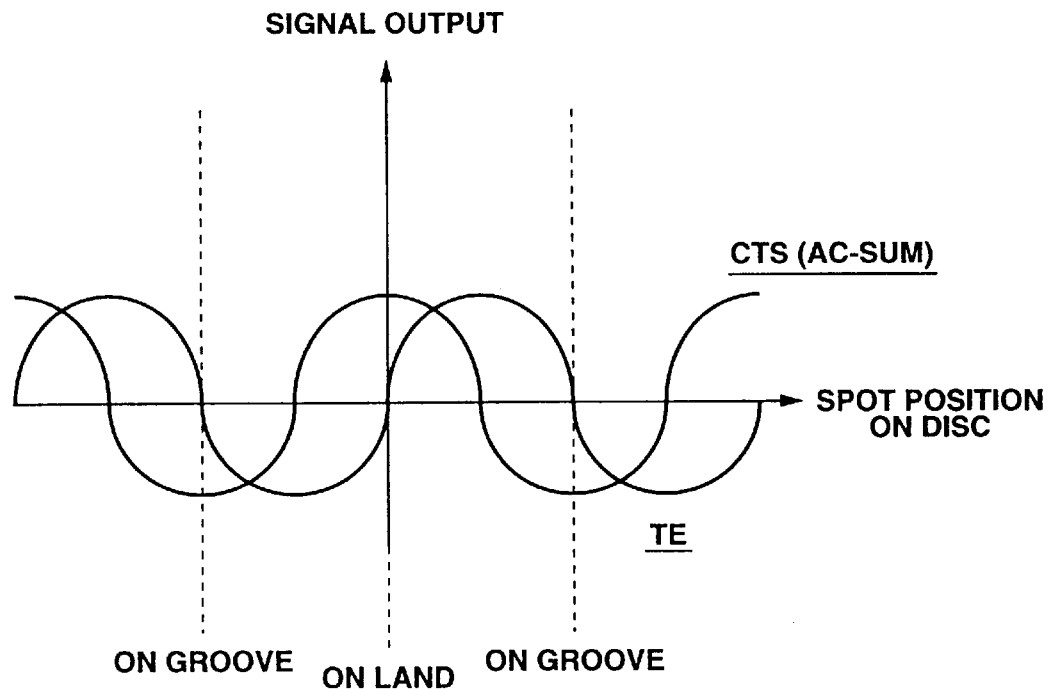
FIG. 2 is a graph showing relation between a tracking error signal and a track recognition signal according to the conventional land recording system.
Figure 3:
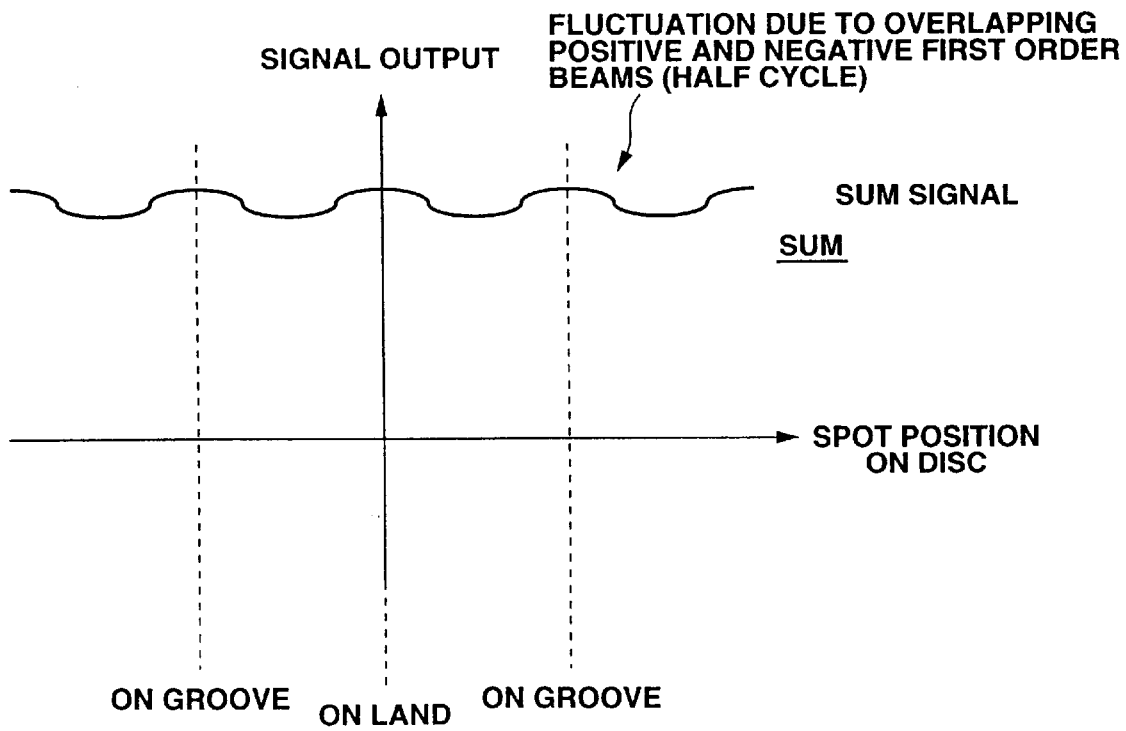
FIG. 3 is a graph showing a sum signal according to the conventional land-groove recording system.
Figure 4:
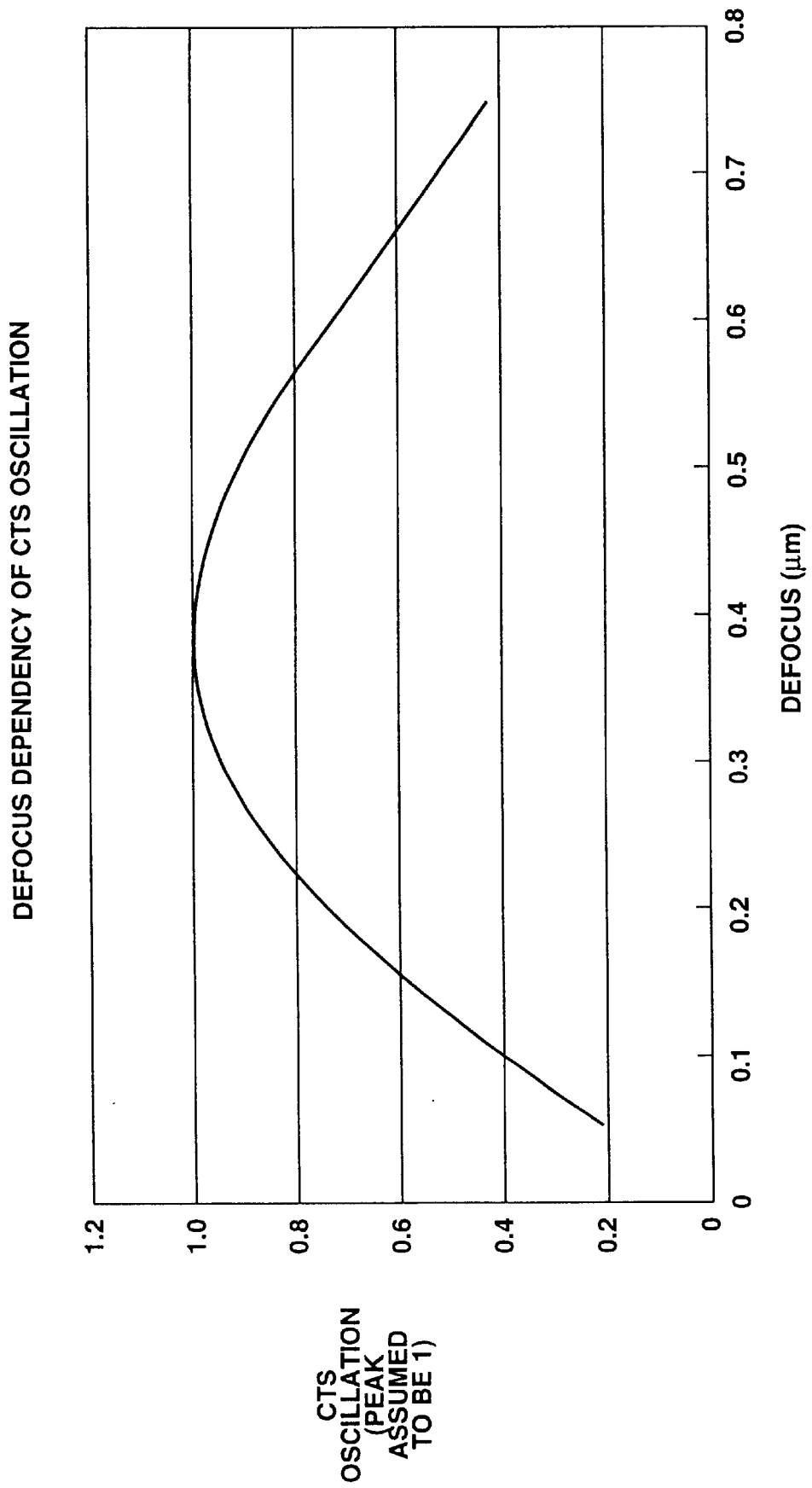
FIG. 4 is a graph showing relation between a track recognition signal amplitude and a secondary spot defocus amount by normalizing a track recognition signal amplitude for Def0 to be 1.

In FIG. 4, the ordinate axis is normalized to 1 for defocus amount Def0. FIG. 4 shows the relation between an amplitude and a focus amount of the track recognition signal for a wider defocus range under the same conditions as those for FIG. 33. When an amplitude should be 60% or more of the track recognition signal amplitude at this time, that amplitude approximately ranges from 0.4 Def0 to 1.7 Def0.

As mentioned above, it is desirable to set an optimum focus amount within the range between 0.4 Def0 and 1.7 Def0. This can provide a track recognition signal characterized by a wide RD margin, a sufficient skew margin, and the like. Further, it may be necessary to ensure a large margin for the upper bound of the defocus amount considering an effect of split positions for the above-mentioned return optical spots on a CTS amplitude. For this purpose, it is further optimal to set the defocus amount within the range between 0.4 Def0 and 1.5 Def0. When the system provides high accuracy and sufficiently operates on a small margin, a track recognition signal amplitude can be 30% or more for the defocus amount causing the maximum amplitude. The defocus amount ranges from 0.2 Def0 to 2.0 Def0.

Figure 37:
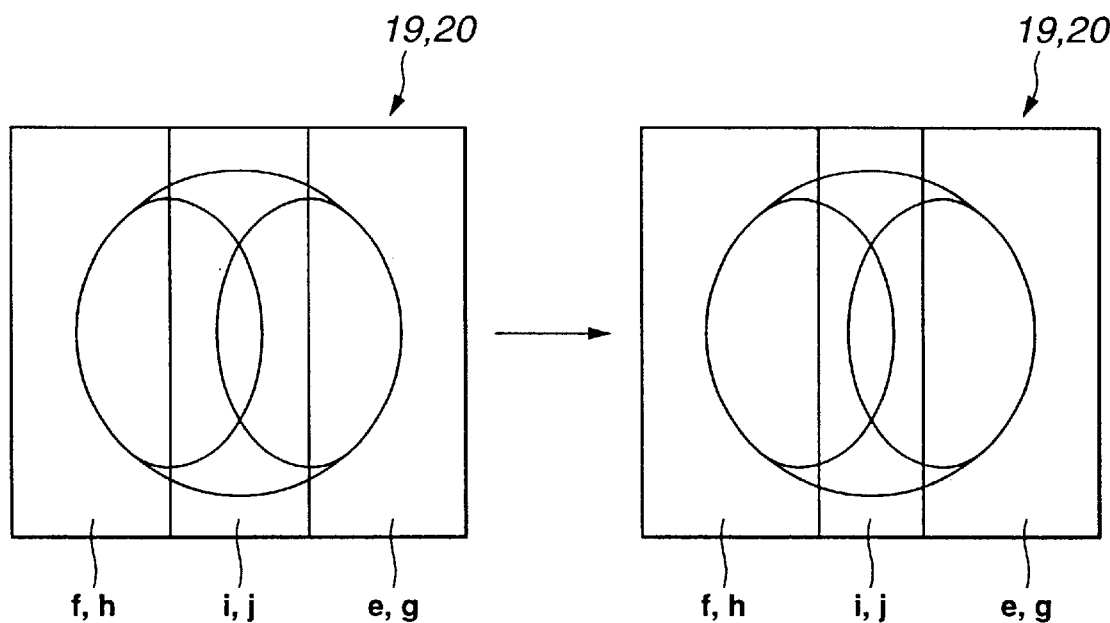
FIG. 37 is a front view showing split positions for return beam spots from secondary spots on a light-receiving surface in the above-mentioned optical pickup apparatus.

A return beam spot from the secondary spot is split by a boundary between light-receiving surfaces. In the above-mentioned simulation, this boundary becomes a split-position and is approximately set to the center of an overlap between the zero order beam and the positive or negative first order beam as shown in FIG. 37. Changing this split position (boundary position) slightly varies a defocus value causing the maximum CTS amplitude.

Figure 43:
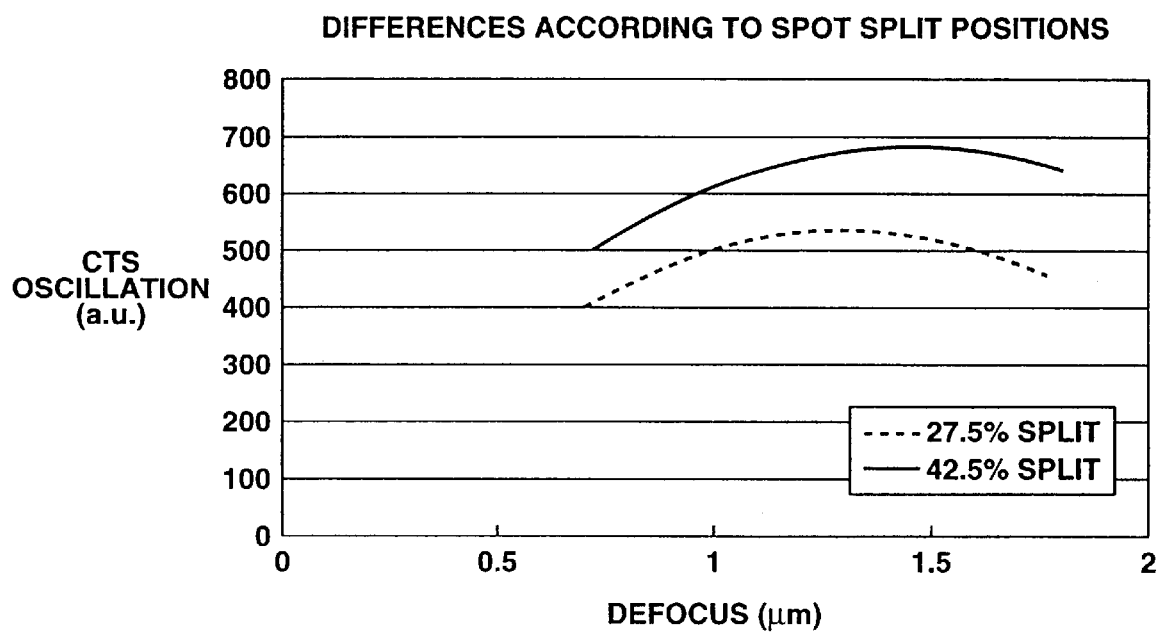
FIG. 43 is a graph showing variation of defocus values causing maximum CTS amplitudes when split positions for return beam spots are varied on a light-receiving element.

When the split position for a return beam spot (the boundary position between light-receiving surfaces) is set to ±27.5% and ±42.5% with reference to the return beam spot radius, FIG. 43 shows variations of the defocus value causing the maximum CTS amplitude. In this case, the condition is ($\lambda$, NA, Tp)=(0.66 ($\mu$m), 0.6, 1.23 ($\mu$m)), for example. As seen from this graph, it is considered that changing the spot split position can decrease the defocus value causing the maximum CTS amplitude down to approximately 0.8 times.

Also when land-groove recording is performed by using a land-groove recording medium having almost the same land and groove widths, the optical pickup apparatus, the optical disc apparatus, and the track recognition signal detection method according to the present invention can provide an excellent track recognition signal based on a simple configuration. Further, it is possible to use the conventional tracking control method. In an example of the tracking control method, the CPI signal just needs to be replaced by the track recognition signal in the present invention. Consequently, it is possible to implement a tracking servo pull-in operation and the count of track traverses and directions (traverse count).

The above-mentioned description has explained the cases where optical parts and elements are arranged individually. The optical pickup apparatus and the optical disc apparatus according to the present invention are not limited thereto. Each optical part and element can be configured by integration. Also in the above-mentioned description, the astigmatic method is used for receiving the focus error signal. The present invention is not limited thereto, and is also effective for the use of the so-called spot size method, the knife edge method, and the like.

When a track cycle causes the zero order beam, the positive and negative first order beams to completely overlap with each other, it is possible to generate a track recognition signal characterized by large intensity distribution and amplitude at a defocused spot. The present invention is not limited thereto. Even when the zero order beam, the positive and negative first order beams do not completely overlap with each other, it is possible to generate a track recognition signal by means of similar operations.

What is claimed is:

1. An optical pickup apparatus comprising:
a light source having at least one light generation point irradiating a light beam;
an objective lens irradiating said light beam onto a signal recording surface of an optical recording medium; and
optical detection means for receiving a reflected light beam from the signal recording surface of said optical recording medium, wherein
a light beam irradiated from said light source comprises a primary light beam which forms a primary spot for recording and/or reproducing an information signal on the signal recording surface of said optical recording medium and a secondary light beam which forms a secondary spot at a position apart from said primary spot on the signal recording surface of said optical recording medium;
said secondary light beam differs from said primary light beam in a distance from an objective lens to a beam-condensing point and this distance difference Def satisfies a range:

$$0.4 \times Def0 \leq Def \leq 1.7 \times Def0$$

assuming that a light emission wavelength for said light source is $\lambda$, a track pitch of said optical recording medium is Tp, and a numerical aperture of said objective lens is NA and that $Def0=[0.178\lambda/\{1-\cos(\sin^{-1} NA)\}]\cdot[\{1=(\lambda/(Tp\cdot NA))\}+2.35]$.

2. The optical pickup apparatus according to claim 1, wherein said secondary spot is formed at a position satisfying $S \approx Tp \cdot n/2$ assuming that S is an absolute value for a distance up to said primary spot in the normal line direction of recording tracks formed on said signal recording surface, Tp is a track pitch, and n is an integer.

3. The optical pickup apparatus according to claim 1, wherein said light source comprises a primary light generation point for generating a primary light beam and a secondary light generation point for generating said secondary light beam differing from said primary light beam in a distance from said objective lens to a beam-condensing point.

4. The optical pickup apparatus according to claim 3, wherein said light source includes said secondary light generation points comprising a first secondary light generation point focused before passing said signal recording surface when said primary spot is focused on said signal recording surface to generate a first secondary light beam for forming a first secondary spot and a second secondary light generation point focused after passing said signal recording surface when said primary spot is focused on said signal recording surface to generate a second secondary light beam for forming a second secondary spot.

5. The optical pickup apparatus according to claim 3, wherein said light source comprises an adjustment mechanism for adjusting positional relation between said secondary spot and a recording track on said signal recording surface without changing a focus position of said primary spot on said signal recording surface.

6. The optical pickup apparatus according to claim 1, wherein said light source comprises a light generation point for generating said primary light beam and secondary light beam generation means for generating said secondary light beam from said primary light beam generated from said light generation point.

7. The optical pickup apparatus according to claim 6, wherein said secondary light beam generation means is a light diffraction element which uses diffraction of a beam generated from said light generation point to generate said secondary light beam differing from said primary light beam in a distance from said objective lens to a beam-condensing point.

8. The optical pickup apparatus according to claim 7, wherein said light diffraction element is a hologram element which diffracts and converges incident light.

9. The optical pickup apparatus according to claim 8, wherein said hologram element is a polarization hologram element.

10. The optical pickup apparatus according to claim 1, wherein said optical detection means comprises a first primary light-receiving section for receiving a primary reflected light beam from said primary spot and a secondary light-receiving section for receiving a secondary reflected light beam from said secondary spot.

11. The optical pickup apparatus according to claim 10, wherein said optical detection means includes said secondary light-receiving sections comprising a first secondary light-receiving section for receiving a first secondary reflected light beam from a first secondary spot and a second secondary light-receiving section for receiving a second secondary reflected light beam from a second secondary spot.

12. The optical pickup apparatus according to claim 10, further comprising an optical branch element for branching a primary reflected light beam to a place different from a first primary light-receiving section of said optical detection means, wherein said optical detection means includes a second primary light-receiving section for independently receiving a light beam branched from said primary reflected light beam.

13. The optical pickup apparatus according to claim 10, wherein said first light-receiving section comprises a primary light beam center light-receiving element for receiving a central portion of a reflected light beam from said primary spot and four primary light beam periphery light-receiving elements which are radially arranged via the central portion of said first primary light-receiving section and receives peripheral portions of the primary light beam except the central portion received by said light beam center light-receiving element.

14. The optical pickup apparatus according to claim 10, wherein said secondary light-receiving section comprises a secondary light beam center light-receiving element for receiving a central portion of a secondary reflected light beam from said secondary spot and two secondary light beam periphery light-receiving elements which are parallel arranged adjacent to both sides of said secondary light beam center light-receiving element.

15. An optical disc apparatus comprising:

an optical pickup apparatus for writing and/or reading an information signal on an optical recording medium having a land and groove and capable of recording an information signal on either or both of the land and the groove;

a servo circuit for controlling a position to write and/or read said information signal based on an output signal from said optical pickup apparatus, wherein said optical pickup apparatus comprises a light source having at least one light generation point for irradiating a light beam, an objective lens for converging and irradiating said light beam onto a signal recording surface of an optical recording medium, and optical detection means for receiving a reflected light beam from a signal recording surface of said optical recording medium;

in said optical pickup apparatus, a light beam irradiated from said light source comprises a primary light beam which forms a primary spot for recording and/or reproducing an information signal on the signal recording surface of said optical recording medium and a secondary light beam which forms a secondary spot at a position apart from said primary spot on the signal recording surface of said optical recording medium; and said secondary light beam differs from said primary light beam in a distance from an objective lens to a beam-condensing point and this distance difference Def satisfies a range:

$$0.4 \times Def0 \leq Def \leq 1.7 \times Def0$$

assuming that a light emission wavelength for said light source is $\lambda$, a track pitch of said optical recording medium is Tp, and a numerical aperture of said objective lens is NA and that $Def0=[0.178\lambda/\{1-\cos(\sin^{-1} NA)\}] \cdot [\{1-(\lambda/(Tp \cdot NA))\}+2.35]$.

16. The optical disc apparatus according to claim 15, wherein said secondary spot is formed at a position satisfying $S \approx Tp \cdot n/2$ assuming that S is an absolute value for a distance up to said primary spot in the normal line direction of recording tracks formed on said signal recording surface, Tp is a track pitch, and n is an integer.

17. The optical disc apparatus according to claim 15, wherein said optical detection means comprises a first primary light-receiving section for receiving a primary reflected light beam from said primary spot and a secondary light-receiving section for receiving a secondary reflected light beam from said secondary spot.

18. The optical disc apparatus according to claim 17, wherein said optical pickup apparatus generates a track recognition signal for determining whether said primary light beam irradiates a land or a groove of said optical recording medium based on a detection signal from said secondary light-receiving section of said optical detection means.

19. The optical disc apparatus according to claim 17, wherein said optical detection means includes said secondary light-receiving sections comprising a first secondary light-receiving section for receiving a first secondary reflected light beam from a first secondary spot and a second secondary light-receiving section for receiving a second secondary reflected light beam from a second secondary spot.

20. The optical disc apparatus according to claim 17, wherein said optical pickup apparatus generates a track recognition signal for determining whether said primary light beam irradiates a land or a groove of said optical recording medium based on a detection signal from a first secondary light-receiving section and a detection signal from a second secondary light-receiving section of said optical detection means.

21. The optical disc apparatus according to claim 17, wherein said first light-receiving section comprises a primary light beam center light-receiving element for receiving a central portion of a reflected light beam from said primary spot and four primary light beam periphery light-receiving elements which are radially arranged via the central portion of said first primary light-receiving section and receives peripheral portions of the primary light beam except the central portion received by said light beam center light-receiving element.

22. The optical disc apparatus according to claim 17, wherein said secondary light-receiving section comprises a secondary light beam center light-receiving element for receiving a central portion of a secondary reflected light beam from said secondary spot and two secondary light beam periphery light-receiving elements which are parallel arranged adjacent to both sides of said secondary light beam center light-receiving element.

23. The optical disc apparatus according to claim 22, wherein said optical pickup apparatus generates a track recognition signal for determining whether said primary light beam irradiates a land or a groove of said optical recording medium based on a detection signal obtained from said two secondary light beam periphery light-receiving elements and/or said secondary light beam center light-receiving element included in said secondary light-receiving section.

24. The optical disc apparatus according to claim 22, wherein said optical pickup apparatus generates a track recognition signal for determining whether said primary light beam irradiates a land or a groove of said optical recording medium based on a detection signal difference obtained from said two secondary light beam periphery light-receiving elements and said secondary light beam center light-receiving element included in said secondary light-receiving section.

25. The optical disc apparatus according to claim 22, wherein said optical detection means includes said secondary light-receiving sections comprising a first secondary light-receiving section for receiving a first secondary reflected light beam from a first secondary spot and a second secondary light-receiving section for receiving a second secondary reflected light beam from a second secondary spot.

26. The optical disc apparatus according to claim 25, wherein said optical pickup apparatus generates a track recognition signal for determining whether said primary light beam irradiates a land or a groove of said optical recording medium with reference to a signal based on a difference between a first detection signal obtained from said two secondary light beam periphery light-receiving elements and/or said secondary light beam center light-receiving element included in said first secondary light-receiving section and a second detection signal obtained from said two secondary light beam periphery light-receiving elements and/or said secondary light beam center light-receiving element included in said second secondary light-receiving section.

27. The optical disc apparatus according to claim 25, wherein said optical pickup apparatus generates a track recognition signal for determining whether said primary light beam irradiates a land or a groove of said optical recording medium with reference to a signal based on a difference between a first difference signal obtained by a detection signal difference from said two secondary light beam periphery light-receiving elements and said secondary light beam center light-receiving element included in said first secondary light-receiving section and a second difference signal based on a detection signal difference obtained from said two secondary light beam periphery light-receiving elements and said secondary light beam center light-receiving element included in said second secondary light-receiving section.

28. An optical disc apparatus comprising:
   an optical pickup apparatus for writing and/or reading an information signal on an optical recording medium having a land and groove and capable of recording an information signal on either or both of the land and the groove;
   a servo circuit for controlling a position to write and/or read said information signal based on an output signal from said optical pickup apparatus, wherein said optical pickup apparatus comprises a light source having at least one light generation point for irradiating a light beam, an objective lens for converging and irradiating said light beam onto a signal recording surface of an optical recording medium, and optical detection means for receiving a reflected light beam from a signal recording surface of said optical recording medium;
   in said optical pickup apparatus, a light beam irradiated from said light source comprises a primary light beam which forms a primary spot for recording and/or reproducing an information signal on the signal recording surface of said optical recording medium and a secondary light beam which forms a secondary spot at a position apart from said primary spot on the signal recording surface of said optical recording medium; and
   said secondary light beam differs from said primary light beam in a distance from an objective lens to a beam-condensing point and this distance difference is based on a light emission wavelength of said light source, a track pitch of said optical recording medium, and a numerical aperture of said objective lens, is output as an output signal from said optical detection means, and is set so as to maximize an amplitude of a track recognition signal for determining whether said primary light beam irradiates a land or a groove on said optical recording medium.

29. The optical disc apparatus according to claim 28, wherein said secondary spot is formed at a position satisfying $S \approx Tp \cdot n/2$ assuming that S is an absolute value for a distance up to said primary spot in the normal line direction of recording tracks formed on said signal recording surface, Tp is a track pitch, and n is an integer.

30. The optical disc apparatus according to claim 28, wherein said optical detection means comprises a primary light-receiving section for receiving a primary reflected light beam from said primary spot and a secondary light-receiving section for receiving a secondary reflected light beam from said secondary spot.

31. The optical disc apparatus according to claim 30, wherein said optical pickup apparatus generates said track recognition signal based on a detection signal from said secondary light-receiving section of said optical detection means.

32. The optical disc apparatus according to claim 30, wherein said optical detection means includes said secondary light-receiving sections comprising a first secondary light-receiving section for receiving a first secondary reflected light beam from a first secondary spot and a second secondary light-receiving section for receiving a second secondary reflected light beam from a second secondary spot.

33. The optical disc apparatus according to claim 30, wherein said optical pickup apparatus generates said track recognition signal based on a detection signal from a first secondary light-receiving section and a detection signal from a second secondary light-receiving section of said optical detection means.

34. The optical disc apparatus according to claim 30, wherein said first light-receiving section comprises a primary light beam center light-receiving element for receiving a central portion of a reflected light beam from said primary spot and four primary light beam periphery light-receiving elements which are radially arranged via the central portion of said first primary light-receiving section and receives peripheral portions of the primary light beam except the central portion received by said light beam center light-receiving element.

35. The optical disc apparatus according to claim 30, wherein said secondary light-receiving section comprises a secondary light beam center light-receiving element for receiving a central portion of a secondary reflected light beam from said secondary spot and two secondary light beam periphery light-receiving elements which are parallel arranged adjacent to both sides of said secondary light beam center light-receiving element.

36. The optical disc apparatus according to claim 35, wherein said optical pickup apparatus generates said track recognition signal based on a detection signal obtained from said two secondary light beam periphery light-receiving elements and/or said secondary light beam center light-receiving element included in said secondary light-receiving section.

37. The optical disc apparatus according to claim 35, wherein said optical pickup apparatus generates said track recognition signal based on a detection signal difference obtained from said two secondary light beam periphery light-receiving elements and said secondary light beam center light-receiving element included in said secondary light-receiving section.

38. The optical disc apparatus according to claim 35, wherein said optical detection means includes said secondary light-receiving sections comprising a first secondary light-receiving section for receiving a first secondary reflected light beam from a first secondary spot and a second secondary light-receiving section for receiving a second secondary reflected light beam from a second secondary spot.

39. The optical disc apparatus according to claim 38, wherein said optical pickup apparatus generates said track recognition signal based on a difference between a first detection signal obtained from said two secondary light beam periphery light-receiving elements and/or said secondary light beam center light-receiving element included in said first secondary light-receiving section and a second detection signal obtained from said two secondary light beam periphery light-receiving elements and/or said secondary light beam center light-receiving element included in said second secondary light-receiving section.

40. The optical disc apparatus according to claim 38, wherein said optical pickup apparatus generates said track recognition signal based on a difference between a first difference signal obtained by a detection signal difference from said two secondary light beam periphery light-receiving elements and said secondary light beam center light-receiving element included in said first secondary light-receiving section and a second difference signal based on a detection signal difference obtained from said two secondary light beam periphery light-receiving elements and said secondary light beam center light-receiving element included in said second secondary light-receiving section.

41. A track recognition signal detection method comprising the steps of:

comprising a light source having at least one light generation point for irradiating a light beam, an objective lens for converging and irradiating said light beam onto a signal recording surface of an optical recording medium having a land and groove and capable of recording an information signal on either or both of the land and the groove, and optical detection means for receiving a reflected light beam from a signal recording surface of said optical recording medium;

providing a light beam irradiated from said light source comprising a primary light beam which forms a primary spot for recording and/or reproducing an information signal on the signal recording surface of said optical recording medium and a secondary light beam which forms a secondary spot at a position apart from said primary spot on the signal recording surface of said optical recording medium;

using an optical pickup apparatus, whereby said secondary light beam differs from said primary light beam in a distance from an objective lens to a beam-condensing point and this distance difference Def satisfies a range:

$$0.4 \times Def0 \leq Def \leq 1.7 \times Def0$$

on the assumption that a light emission wavelength for said light source is $\lambda$, a track pitch of said optical recording medium is Tp, and a numerical aperture of said objective lens is NA and that $Def0=[0.178\lambda/\{1-\cos(\sin^{-1} NA)\}] \cdot [\{1-(\lambda/(Tp \cdot NA))\}+2.35]$; and generating a track recognition signal for determining whether said primary light beam irradiates a land or a groove of said optical recording medium based on an output signal from said optical detection means.

42. The track recognition signal detection method according to claim 41, comprising the steps of:

providing said optical detection means comprising a primary light-receiving section for receiving a primary reflected light beam from said primary spot and a secondary light-receiving section for receiving a secondary reflected light beam from said secondary spot; and generating said track recognition signal based on a detection signal from said secondary light-receiving section of said optical detection means.

43. The track recognition signal detection method according to claim 42, comprising the steps of:

allowing said optical detection means to include said secondary light-receiving sections comprising a first secondary light-receiving section for receiving a first secondary reflected light beam from a first secondary spot and a second secondary light-receiving section for receiving a second secondary reflected light beam from a second secondary spot; and outputting said track recognition signal based on a detection signal from a first secondary light-receiving section and a detection signal from a second secondary light-receiving section of said optical detection means.

* * * * *